(12) United States Patent
Arndt et al.

(10) Patent No.: US 10,229,075 B2
(45) Date of Patent: *Mar. 12, 2019

(54) TECHNIQUES FOR ESCALATING INTERRUPTS IN A PROCESSING UNIT USING VIRTUAL PROCESSOR THREAD GROUPS AND SOFTWARE STACK LEVELS

(71) Applicant: INTERNATIONAL BUSINESS MACHINES CORPORATION, Armonk, NY (US)

(72) Inventors: Richard L. Arndt, Austin, TX (US); Florian A. Auernhammer, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,545

(22) Filed: Nov. 28, 2017

(65) Prior Publication Data

US 2018/0121378 A1    May 3, 2018

Related U.S. Application Data

(63) Continuation of application No. 15/339,382, filed on Oct. 31, 2016, now Pat. No. 9,870,329.

(51) Int. Cl.
*G06F 13/26* (2006.01)
*G06F 12/122* (2016.01)
(Continued)

(52) U.S. Cl.
CPC .............. *G06F 13/26* (2013.01); *G06F 9/542* (2013.01); *G06F 12/122* (2013.01); *G06F 13/24* (2013.01);
(Continued)

(58) Field of Classification Search
USPC .................................................. 710/260–269
See application file for complete search history.

(56) References Cited

U.S. PATENT DOCUMENTS 5,469,571 A    11/1995  Bunnell
5,491,824 A     2/1996  Koshi
(Continued)

OTHER PUBLICATIONS

Arndt et al. U.S. Appl. No. 15/334,857, filed Oct. 26, 2016, Non-Final Office Action dated Apr. 24, 2017.
(Continued)

*Primary Examiner* — Raymond N Phan
(74) *Attorney, Agent, or Firm* — Michael R. Long; Steven L. Bennett

(57) ABSTRACT

A method of handling interrupts includes receiving an event notification message (ENM) that specifies a level, an event target number (ETN), and a number of bits to ignore. A group of virtual processor threads that may be potentially interrupted are determined based on the ETN, the number of bits to ignore, and a process identifier when the level specified in the ENM corresponds to a user level. The ETN identifies a specific virtual processor thread and the number of bits to ignore identifies the number of lower-order bits to ignore when determining a group of virtual processor threads that may be potentially interrupted. In response to no virtual processor thread within the group of virtual processor threads being dispatched and operating on an associated physical processor, an escalate message that includes an escalate event number is transmitted. The escalate event number is used to generate a subsequent ENM.

20 Claims, 18 Drawing Sheets

(51) Int. Cl.
   *G06F 13/40* (2006.01)
   *G06F 13/24* (2006.01)
   *G06F 13/28* (2006.01)
   *G06F 9/54* (2006.01)
   *G06F 12/12* (2016.01)

(52) U.S. Cl.
   CPC .......... *G06F 13/28* (2013.01); *G06F 13/4068* (2013.01); *G06F 12/12* (2013.01); *G06F 2212/70* (2013.01)

(56) References Cited

U.S. PATENT DOCUMENTS

| | | | |
|---|---|---|---|
| 5,506,975 | A | 4/1996 | Onodera |
| 5,701,495 | A | 12/1997 | Arndt et al. |
| 5,892,957 | A | 4/1999 | Normoyle et al. |
| 5,905,898 | A | 5/1999 | Qureshi et al. |
| 6,006,247 | A | 12/1999 | Browning et al. |
| 6,061,757 | A | 5/2000 | Arimilli et al. |
| 6,163,829 | A | 12/2000 | Greim et al. |
| 6,338,111 | B1 | 1/2002 | Stevens |
| 6,430,643 | B1 | 8/2002 | Arndt |
| 7,003,611 | B2 | 2/2006 | Arndt |
| 7,398,343 | B1 | 7/2008 | Marmash et al. |
| 7,584,328 | B2 | 9/2009 | Brink et al. |
| 7,653,912 | B2 | 1/2010 | Frank et al. |
| 7,821,980 | B2 | 10/2010 | Chakrabarti et al. |
| 8,286,162 | B2 | 10/2012 | Neiger et al. |
| 8,312,197 | B2 | 11/2012 | Schwarz et al. |
| 8,402,441 | B2 | 3/2013 | Budko et al. |
| 8,510,599 | B2 | 8/2013 | Coneski et al. |
| 8,569,235 | B2 | 10/2013 | Duggan |
| 8,719,823 | B2 | 5/2014 | Subrahmanyam et al. |
| 8,881,148 | B2 | 11/2014 | Diaz et al. |
| 8,996,774 | B2 | 3/2015 | Chew |
| 9,003,094 | B2 | 4/2015 | Tsirkin et al. |
| 9,009,377 | B2 | 4/2015 | Machnicki et al. |
| 9,378,047 | B1 | 6/2016 | Gould et al. |
| 9,870,329 | B2 * | 1/2018 | Arndt .................. G06F 13/26 |
| 2005/0125793 | A1 | 6/2005 | Aguilar, Jr. et al. |
| 2006/0010277 | A1 | 1/2006 | Arndt et al. |
| 2006/0130062 | A1 | 6/2006 | Burdick et al. |
| 2007/0180163 | A1 | 8/2007 | Todoroki et al. |
| 2008/0109564 | A1 | 5/2008 | Arndt et al. |
| 2010/0262740 | A1 | 10/2010 | Borchers et al. |
| 2010/0274940 | A1 | 10/2010 | Ahmad et al. |
| 2011/0078696 | A1 | 3/2011 | Blackburn et al. |
| 2011/0088037 | A1 | 4/2011 | Glistvain |
| 2012/0084487 | A1 | 4/2012 | Barde |
| 2012/0151111 | A1 | 6/2012 | Jung |
| 2013/0086124 | A1 | 4/2013 | Bahl et al. |
| 2014/0143467 | A1 | 5/2014 | Thakkar |
| 2014/0156894 | A1 | 6/2014 | Tsirkin et al. |
| 2014/0229648 | A1 | 8/2014 | Tsirkin et al. |
| 2016/0139942 | A1 | 5/2016 | Tsirkin et al. |
| 2016/0342543 | A1 | 11/2016 | Bonzini et al. |

OTHER PUBLICATIONS

Arndt et al. U.S. Appl. No. 15/334,857, filed Oct. 26, 2016, Notice of Allowance dated Aug. 14, 2017.
Arndt et al. U.S. Appl. No. 15/339,382, filed Oct. 31, 2016, Non-Final Office Action dated Feb. 23, 2017.
Arndt et al. U.S. Appl. No. 15/339,382, filed Oct. 31, 2016, Notice of Allowance dated Dec. 8, 2017.
Arndt et al. U.S. Appl. No. 15/339,428, filed Oct. 31, 2016, Non-Final Office Action dated Apr. 6, 2017.
Arndt et al. U.S. Appl. No. 15/339,428, filed Oct. 31, 2016, Notice of Allowance dated Oct. 19, 2017.
Arndt et al. U.S. Appl. No. 15/335,047, filed Oct. 26, 2016, Non-Final Office Action dated Feb. 14, 2017.
Arndt et al. U.S. Appl. No. 15/339,469, filed Oct. 31, 2016, Notice of Allowance dated Sep. 7, 2017.
Arndt et al. U.S. Appl. No. 15/334,924, filed Oct. 26, 2016, Notice of Allowance dated May 9, 2017.
Arndt et al. U.S. Appl. No. 15/334,985, filed Oct. 26, 2016, Non-Final Difice Action dated Feb. 13, 2017.
Arndt et al. U.S. Appl. No. 15/334,985, filed Oct. 26, 2016, Notice of Allowance dated Sep. 7, 2017.
Arndt et al. U.S. Appl. No. 15/339,469, filed Oct. 31, 2016, Non-Final Office Action dated Feb. 14, 2017.
Arndt et al. U.S. Appl. No. 15/335,047, filed Oct. 26, 2016, Notice of Allowance dated Aug. 28, 2017.
Arndt et al. U.S. Appl. No. 15/340,076, filed Nov. 1, 2016, Notice of Allowance dated Apr. 25, 2018.
Arndt et al. U.S. Appl. No. 15/816,597, filed Nov. 17, 2017, Non-Final Office Action dated Jan. 26, 2018.
Arndt et al. U.S. Appl. No. 15/816,597, filed Nov. 17, 2017, Notice of Allowance dated Jun. 5, 2018.
Arndt et al. U.S. Appl. No. 15/340,083, filed Nov. 1, 2016, Non-Final Office Action dated Mar. 22, 2018.
Arndt et al. U.S. Appl. No. 15/340,083, filed Nov. 1, 2016, Notice of Allowance dated Sep. 21, 2018.

* cited by examiner

| Event Notification Message (ENM) 302 |
|---|
| Event Target Number \| Event Source Number \| Event Priority |

(Physical Processor Thread Number)

Prior Art
*Figure 3A*

| Notification Rejection Message (NRM) 304 |
|---|
| Event Source Number |

Prior Art
*Figure 3B*

| End of Interrupt (EOI) Message 306 |
|---|
| Event Source Number |

Prior Art
*Figure 3C*

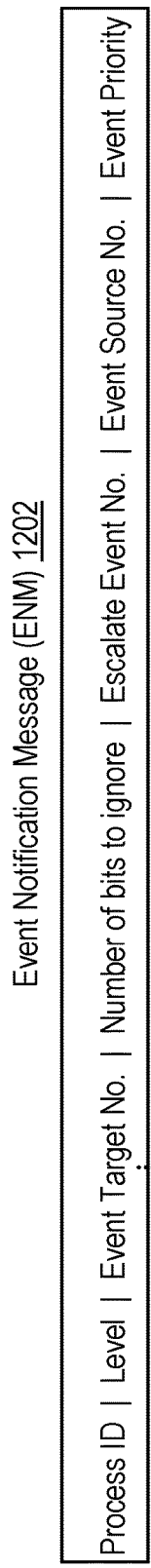
Event Notification Message (ENM) 1202
Process ID | Level | Event Target No. | Number of bits to ignore | Escalate Event No. | Event Source No. | Event Priority
(Virtual Processor Thread No.)
*Figure 12A*
Escalate Message 1204
| Escalate Event No. |
*Figure 12B*
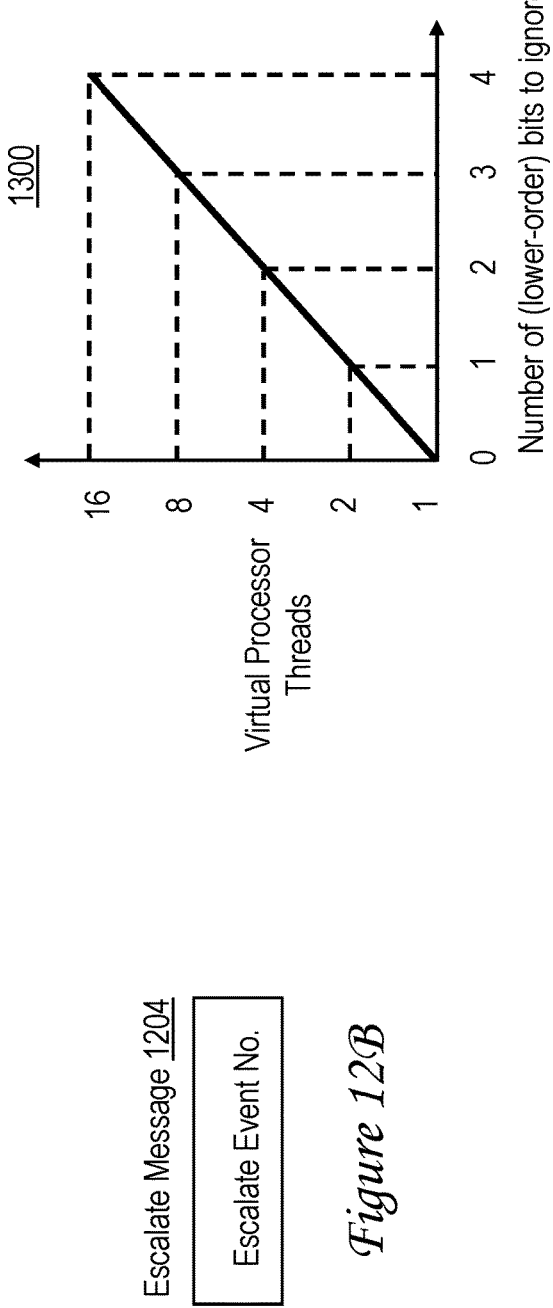
*Figure 13*

TECHNIQUES FOR ESCALATING INTERRUPTS IN A PROCESSING UNIT USING VIRTUAL PROCESSOR THREAD GROUPS AND SOFTWARE STACK LEVELS

This application is a continuation of U.S. patent application Ser. No. 15/339,382, filed Oct. 31, 2016, which is incorporated herein by reference in its entirety or all purposes.

BACKGROUND OF THE INVENTION

The present disclosure is generally directed to data processing systems and, more specifically, to techniques for escalating interrupts in a processing unit of a data processing system using virtual processor thread groups and software stack levels.

In data processing systems, an interrupt signal (interrupt) is generated to indicate to a processor that an event requires attention. Depending on a priority of an interrupt, a processor may respond by suspending current activities, saving state, and executing a function (i.e., an interrupt handler) to service the event. For example, hardware interrupts may be generated by an input/output (I/O) device, e.g., disk drive controller, a keyboard, a mouse, or other peripheral device. In contrast, software interrupts may be caused either by an exception condition in a processor or a special instruction in an instruction set architecture (ISA) that, when executed, causes an interrupt to be generated. Following interrupt servicing, a processor resumes suspended activities.

An interrupt handler, also known as an interrupt service routine (ISR), is a callback function (e.g., implemented in firmware, an operating system (OS), or a device driver) whose execution is triggered by an interrupt. Interrupt handlers perform various interrupt dependent functions. For example, pressing a key on a computer keyboard or moving a computer mouse triggers interrupts that call respective interrupt handlers to read a key or a mouse position and copy associated information into memory of a computer. In data processing systems, an interrupt controller may be implemented to combine multiple interrupt sources onto one or more processor exception lines, while facilitating the assignment of priority levels to different interrupts.

BRIEF SUMMARY

A method of handling interrupts includes receiving an event notification message (ENM) that specifies a level, an event target number (ETN), and a number of bits to ignore. A group of virtual processor threads that may be potentially interrupted are determined based on the ETN, the number of bits to ignore, and a process identifier when the level specified in the ENM corresponds to a user level. The ETN identifies a specific virtual processor thread and the number of bits to ignore identifies the number of lower-order bits to ignore when determining a group of virtual processor threads that may be potentially interrupted. In response to no virtual processor thread within the group of virtual processor threads being dispatched and operating on an associated physical processor, an escalate message that includes an escalate event number is transmitted. The escalate event number is used to generate a subsequent ENM.

BRIEF DESCRIPTION OF THE SEVERAL VIEWS OF THE DRAWINGS

FIG. 3A is a diagram of exemplary fields of a conventional event notification message (ENM);

FIG. 3B is a diagram of exemplary fields of a conventional notification rejection message (NRM);

FIG. 3C is a diagram of exemplary fields of a conventional end-of-interrupt (EOI) message;

FIG. 12A is a diagram of exemplary fields of an ENM that is configured according to one embodiment of the present disclosure;

FIG. 12B is a diagram of exemplary fields of an exemplary escalate message that is configured according to one embodiment of the present disclosure;

FIG. 13 is a graph that depicts a relationship between the number of lower-order bits to ignore and virtual processor (VP) threads that may service an associated interrupt according to an embodiment of the present disclosure;

DETAILED DESCRIPTION

Figure 1:
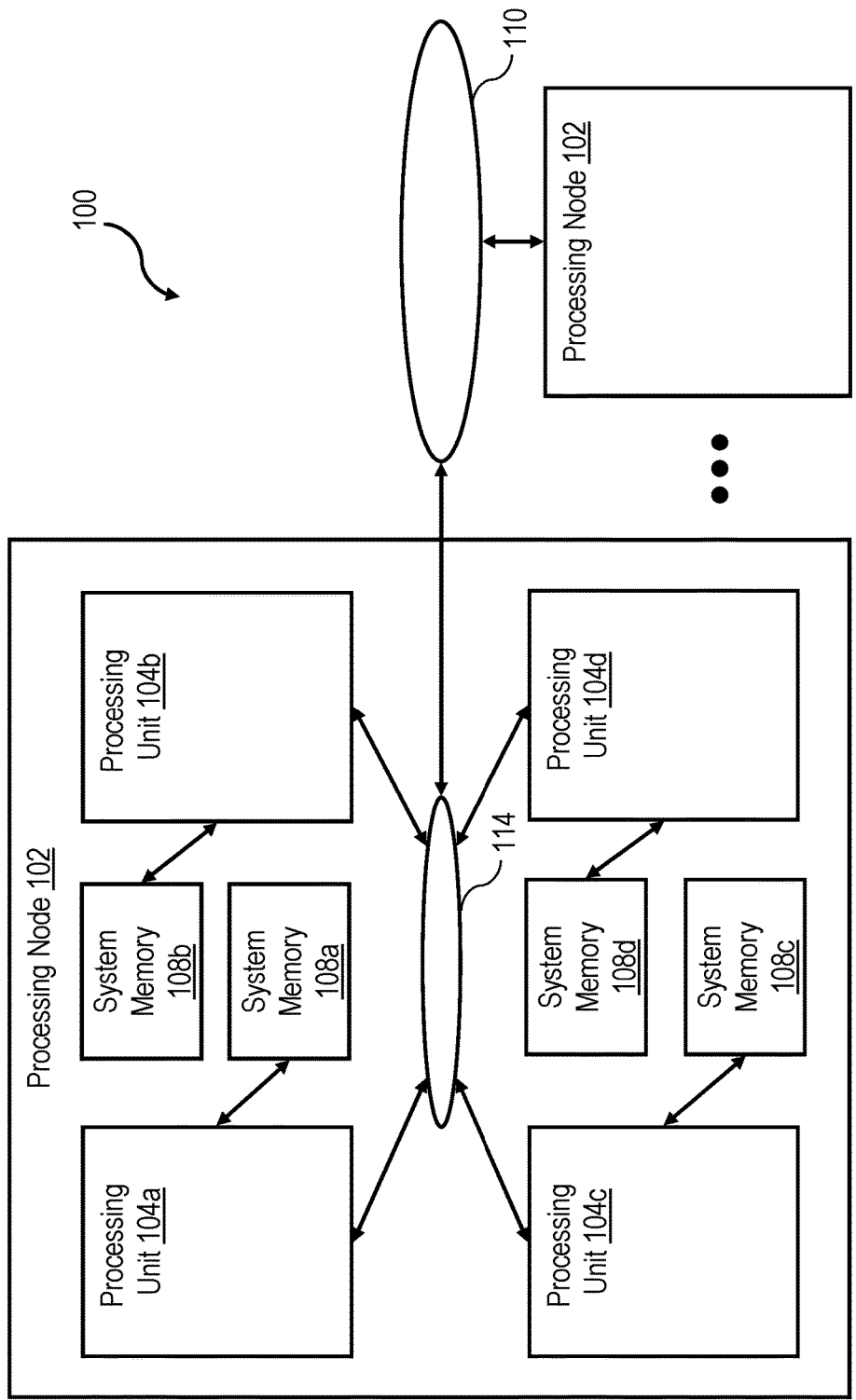
FIG. 1 is a high-level block diagram of an exemplary data processing system in accordance with one embodiment of the present disclosure.

With reference now to the figures, wherein like reference numerals refer to like and corresponding parts throughout, and in particular with reference to FIG. 1, there is illustrated a high level block diagram depicting an exemplary data processing system 100 that implements one or more interrupt presentation controllers (IPCs) and multiple interrupt source controllers (ISCs) configured in accordance with one or more embodiments of the present disclosure. In the depicted embodiment, data processing system 100 is a cache coherent symmetric multiprocessor (SMP) data processing system including multiple processing nodes 102 for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each which may be realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

Processing units 104 each include a memory controller (not shown) coupled to local interconnect 114 to provide an interface to a respective system memory 108. Data and instructions residing in system memories 108 can generally be accessed, cached, and modified by a processor core in any processing unit 104 of any processing node 102 within data processing system 100. System memories 108 thus form the lowest level of memory storage in the distributed shared memory system of data processing system 100. In alternative embodiments, one or more memory controllers (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
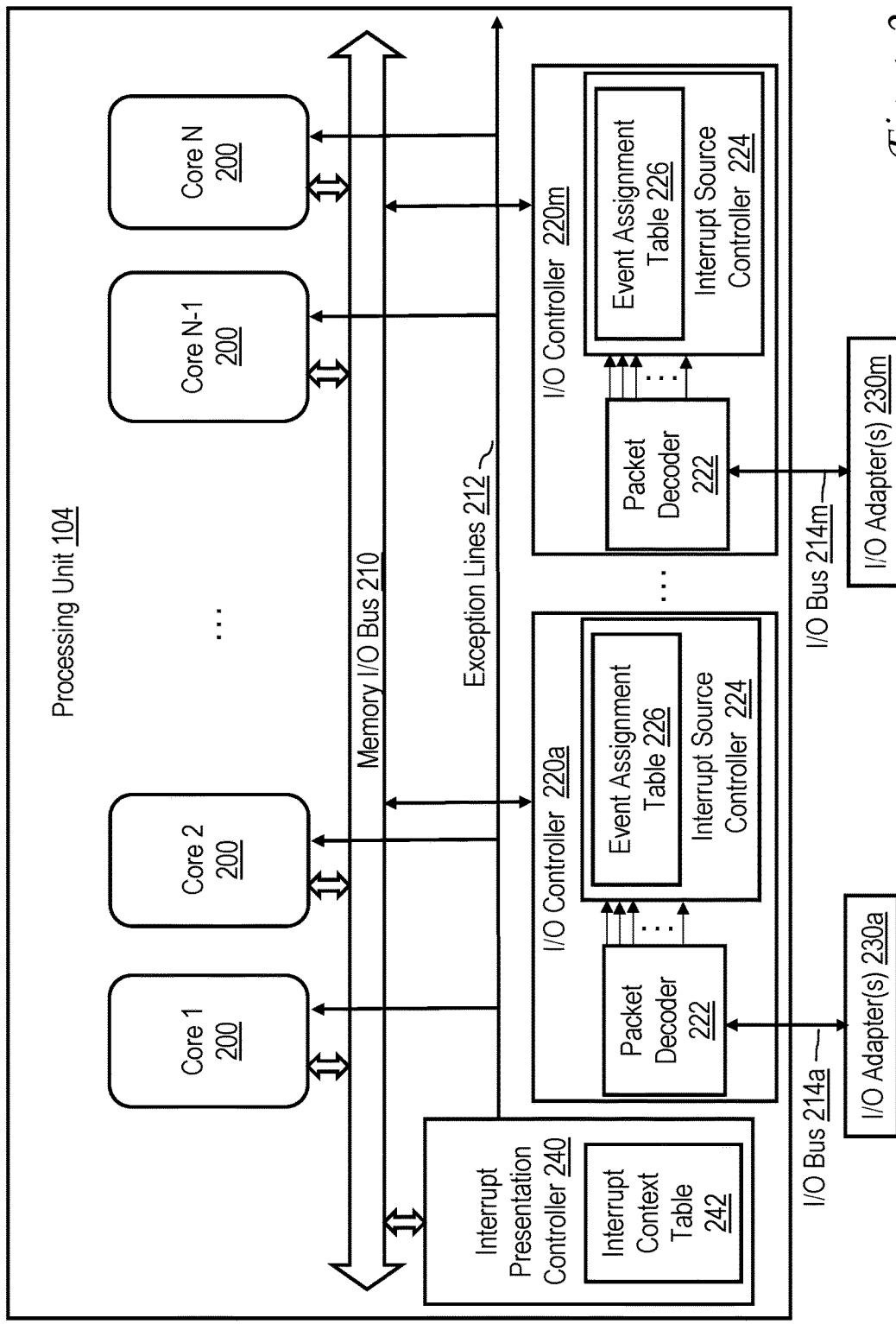
FIG. 2 is a more detailed block diagram of an exemplary processing unit in accordance with one embodiment of the present disclosure.

Referring now to FIG. 2, a more detailed block diagram of an exemplary processing unit 104, in accordance with one embodiment of the present disclosure, is depicted. In the depicted embodiment, each processing unit 104 is an integrated circuit including multiple processor cores 200 for processing instructions and data. In a preferred embodiment, each processor core 200 supports simultaneous multithreading (SMT) and thus is capable of independently executing multiple hardware threads of execution simultaneously.

Figure 16A:
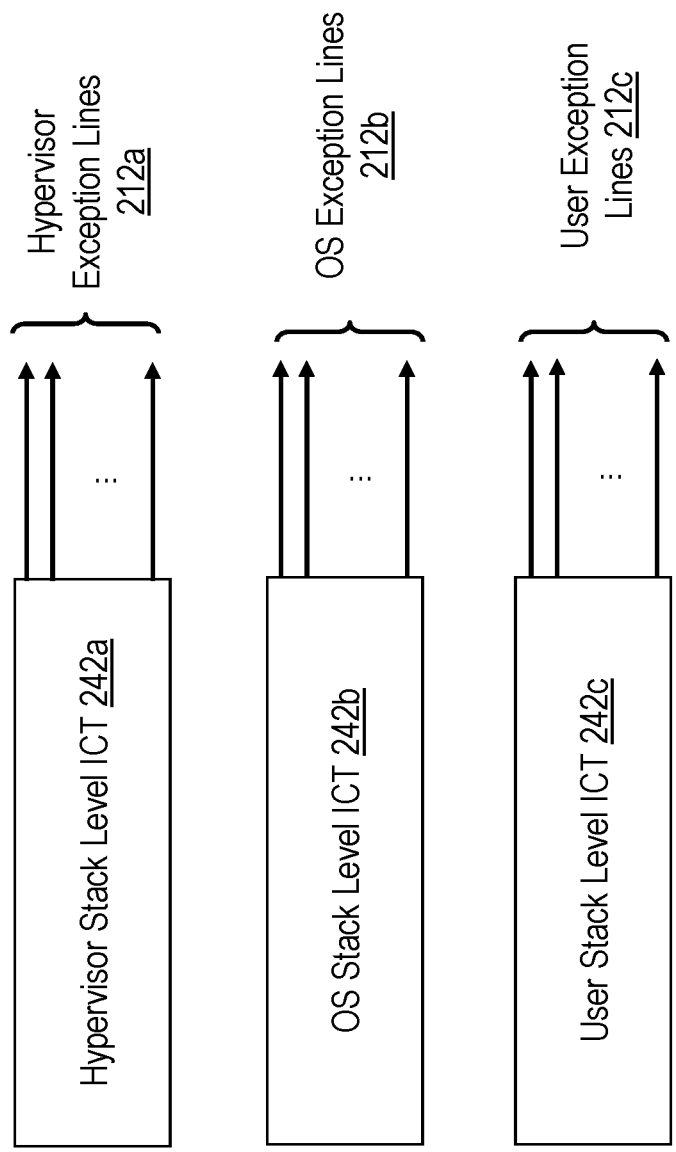
FIG. 16A is a block diagram that illustrates that the IPC of FIG. 15 is configured according to one embodiment of the present disclosure to implement three interrupt context tables (ICTs), i.e., a hypervisor stack level ICT, an operating systems (OS) stack level ICT, and a user stack level ICT.

Each processor core 200 is coupled to an interrupt presentation controller (IPC) 240 via memory I/O bus 210. In one or more embodiments, IPC 240 includes a single interrupt context table (ICT) 242 that maintains various information for physical processor (PP) threads. In one or more other embodiments, a different ICT 242 is implemented for each software stack level that is dispatched on a PP thread (see, for example, FIG. 16A). As is illustrated in FIG. 16A, ICT 242a is implemented for a hypervisor (Hyp) stack level, ICT 242b is implemented for an operating system (OS) stack level, and ICT 242c is implemented for a user stack level. It should be appreciated that an IPC configured according to the present disclosure may implement more than three different software stack levels. In one or more embodiments, IPC 240 is coupled to each processor core 200 via respective exception lines 212, which are utilized to notify each processor core 200 of an associated interrupt for an assigned virtual processor thread. In embodiments in which a different ICT 242 is implemented for each software stack level, different exceptions lines 212 are implemented for each software stack level. IPC 240 is also coupled to I/O controllers 220 via memory I/O bus 210. IPC 240 is configured to receive/send information via memory I/O bus 210 from/to I/O controllers 220 and/or processor cores 200.

Each I/O controller 220 includes a packet decoder 222 and an interrupt source controller (ISC) 224 that includes an event assignment table (EAT) 226, whose values may be set via software (e.g., by a hypervisor). Each I/O controller 220 is coupled to an I/O adapter 230 via an I/O bus 214. A device or devices (not shown), e.g., disk drive, keyboard, mouse, may initiate interrupt generation by I/O controller 220 by signaling I/O adapter 230 to send a packet to packet decoder 222 of I/O controller 220 via I/O bus 214. Event assignment table (EAT) 226 includes information that I/O controller 220 uses to create event notification messages (ENMs) that are sent to IPC 240 via memory I/O bus 210. While only a single interrupt presentation controller is illustrated in FIG. 2, it should be appreciated that a processing unit configured according to the present disclosure may include more than one interrupt presentation controller.

With reference now to FIG. 3A, a structure of an exemplary conventional event notification message (ENM) 302 is illustrated. ENM 302 includes an 'event target number' field, an 'event source number' field, and an 'event priority' field, as well as a field (not shown) that identifies the message as an event notification message. A value in the 'event target number' field identifies a physical processor thread that is to be interrupted to facilitate servicing of an associated interrupt by an associated processor core. A value in the 'event source number' field identifies a notification source that generated the interrupt. A value in the 'event priority' field identifies a priority level of the interrupt. ENM 302 is generated and issued by a conventional ISC 424 (see FIG. 4) to indicate that a notification source (identified by the 'event source number' field has generated the interrupt) and is received and processed by a conventional IPC 540 (see FIG. 5).

With reference now to FIG. 3B, a structure of an exemplary conventional notification rejection message (NRM) 304 is illustrated. NRM 304 includes an 'event source number' field, as well as a field (not shown) that identifies the message as a notification rejection message. NRM 304 is generated and issued by IPC 540 (see FIG. 5) and is received and processed by ISC 424 (see FIG. 4) to indicate, to ISC 424, that the requested interrupt was rejected and needs to be reissued.

With reference now to FIG. 3C, a structure of an exemplary conventional end-of-interrupt (EOI) message 306 is illustrated. EOI message 306 includes an 'event source number' field, as well as a field (not shown) that identifies the message as an EOI message. EOI message 304 is generated and issued by IPC 540 (see FIG. 5) and sent to ISC 424 (see FIG. 4) to indicate, to ISC 424, that an interrupt requested by a device associated with the event source number has been serviced.

Figure 4:
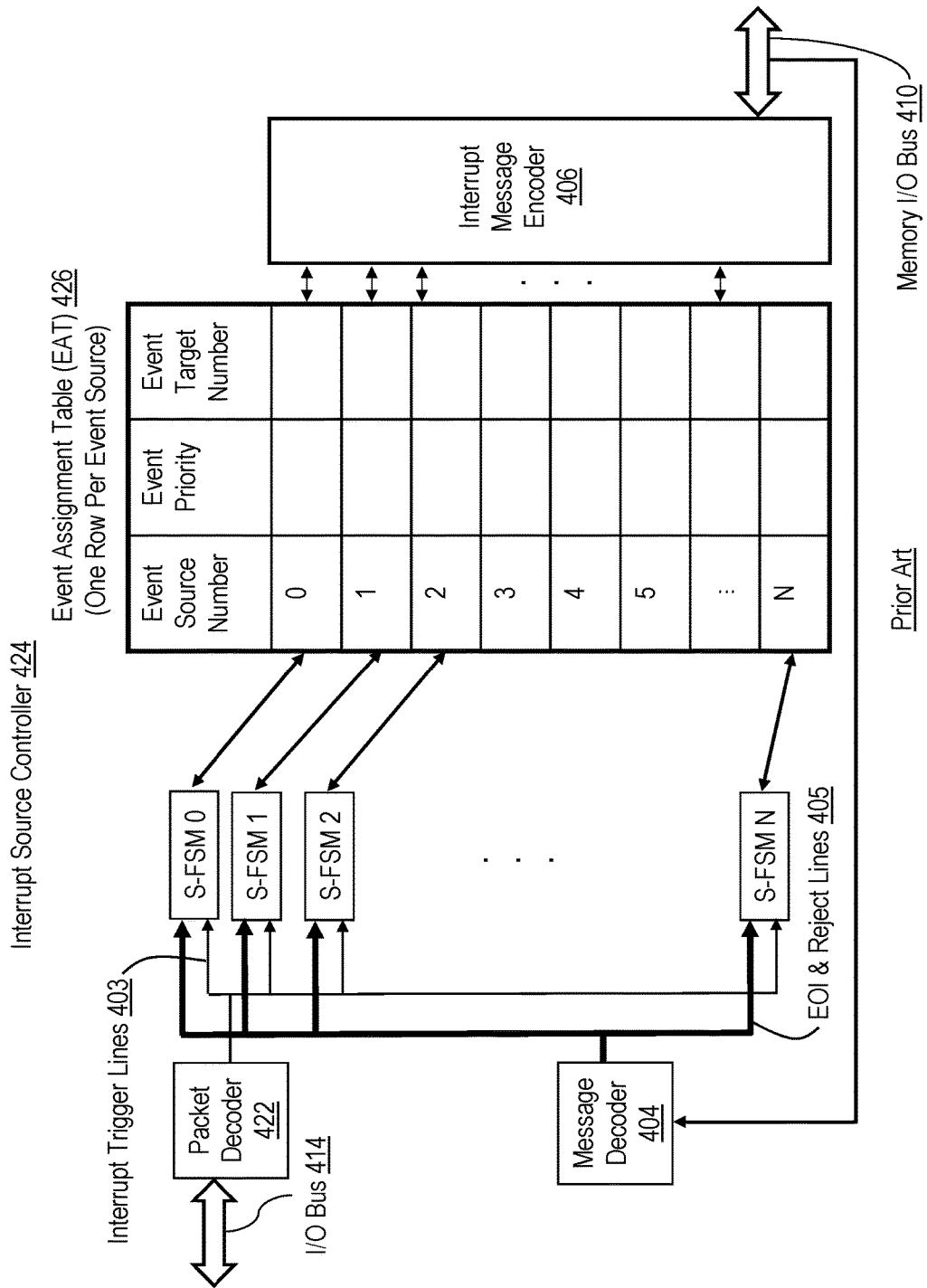
FIG. 4 is a block diagram of relevant components of an exemplary conventional interrupt source controller (ISC)

With reference to FIG. 4, relevant components of conventional ISC 424 are illustrated. It should be appreciated that ISC 424 is replaced by ISC 224 in a processing unit configured according to the present disclosure. ISC 424 is included within an interrupt controller that also includes a packet decoder 422 that is coupled to an I/O bus 414 (similar to I/O bus 214 of FIG. 2), a message decoder 404 (that is used to decode EOI messages 306 and/or NRMs 304 received via memory I/O bus 410 (similar to memory I/O bus 210 of FIG. 2)), an event assignment table (EAT) 426, and an interrupt message encoder 406 that utilizes appropriate information in EAT 426 to generate ENMs 302 for an interrupt source. Packet decoder 422 is configured to decode packets received via I/O bus 414 and select a finite state machine (FSM) to process a received packet based on an event source number of a source of the packet. As is illustrated, ISC 424 includes an FSM for each row (i.e., S-FSM 0 through S-FSM N) in EAT 426 that is configured to write information into EAT 426 to facilitate building ENMs 302. It should be appreciated that the event source number illustrated in EAT 426 is not a field, but is only used to indicate a row number. For example, source number '0' is assigned to row number '0' of EAT 426, source number '1' is assigned to row number '1' of EAT 426, etc. In EAT 426, each row has an associated 'event priority' field and an 'event target number' field, whose values are utilized to populate corresponding fields in an ENM 302, which is generated by interrupt message encoder 406 when an interrupt is requested by an associated I/O device.

Figure 5:
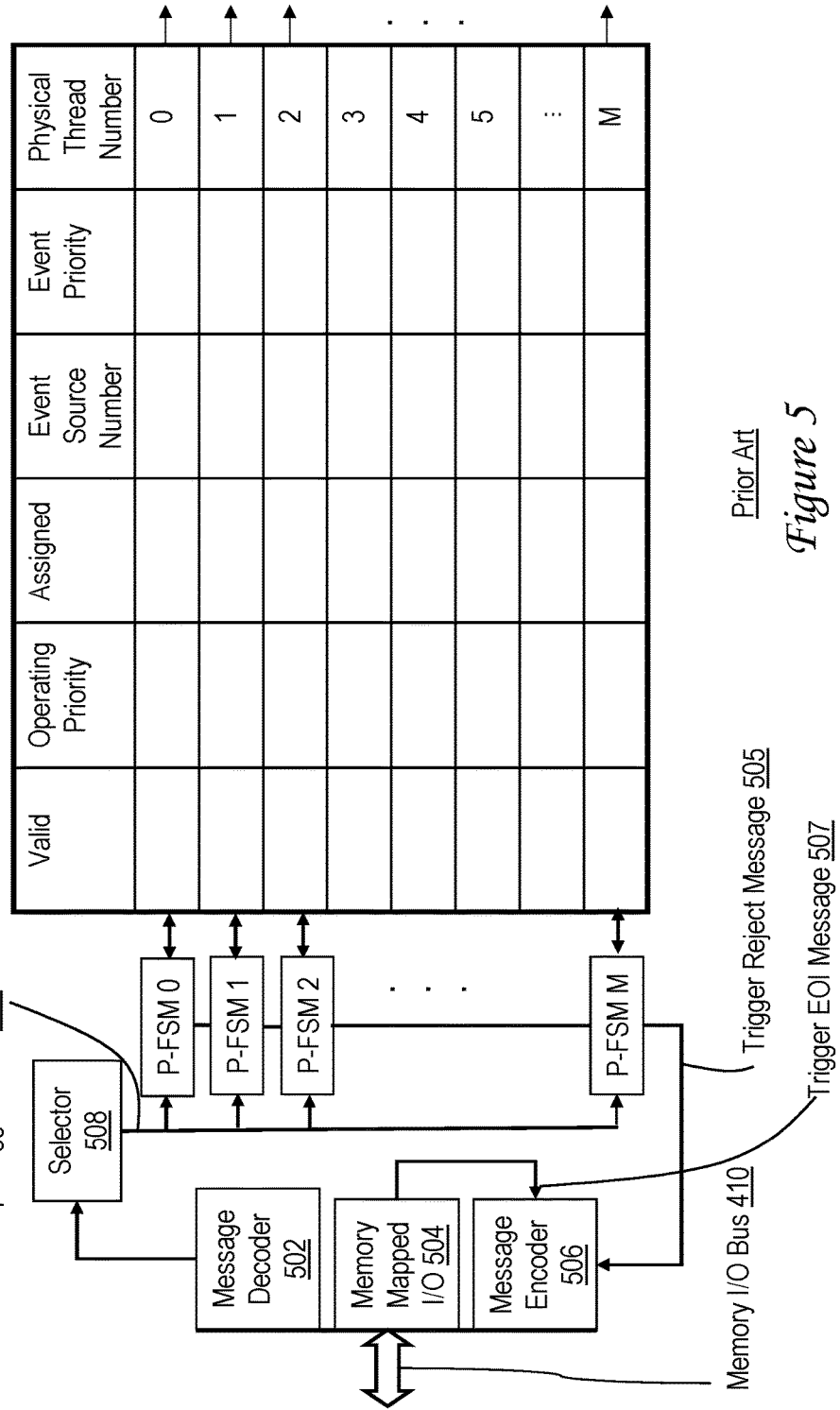
FIG. 5 is a block diagram of relevant components of an exemplary conventional interrupt presentation controller (IPC)

With reference to FIG. 5, relevant components of conventional IPC 540 are illustrated. It should be appreciated that IPC 540 is replaced by IPC 240 in a processing unit configured according to the present disclosure. IPC 540 includes a message decoder 502, a memory mapped I/O (MMIO) unit 504, and a message encoder 506 coupled to memory I/O bus 410. Processor cores communicate with IPC 540 via MMIO unit 504, using MMIO loads and MMIO stores. IPC 540 receives messages from ISC 424 via message decoder 502. IPC 540 generates messages for ISC 424 via message encoder 506. MMIO unit 504 issues a trigger EOI message 507 to message encoder 506 to cause message encoder 506 to generate and send an EOI message 306 on memory I/O bus 410 to ISC 424. Message decoder 502 is coupled to selector 522, which is configured to select an FSM (i.e., one of P-FSM 1 through P-FSM M) based on an event target number associated with a received ENM 302. FSMs of IPC 540 access interrupt context table (ICT) 542 to initiate generation of an exception to a physical processor thread executing on a processor core and to initiate generation of a trigger reject message 505 to message encoder 506, which generates an NRM 304 in response to trigger reject message 505.

It should be appreciated that the physical thread number illustrated in ICT 542 is not a field, but is only used to indicate a row. For example, physical thread number '0' is assigned to row number '0' of ICT 542, physical thread number '1' is assigned to row number '1' of ICT 542, etc. In ICT 542, each row has an associated 'valid' field, an 'operating priority' field, an 'assigned' field, an 'event source number' field, and an 'event priority' field, whose values are set by FSMs and may be accessed to return values to a processor core in response to an MMIO load.

It should be appreciated that various blocks of the processes described herein as being executed by an ISC (both conventionally and per embodiments of the present disclosure) may run simultaneously per row of an associated EAT and that various blocks of the processes described herein as being executed by an IPC (both conventionally and per embodiments of the present disclosure) may run simultaneously per row of an associated ICT. As examples, at least portions of the various processes may be performed by FSM logic associated with a given row of an EAT and/or ICT or an engine may be implemented to perform the various processes while sequencing through all rows of an EAT and/or ICT.

Figure 6:
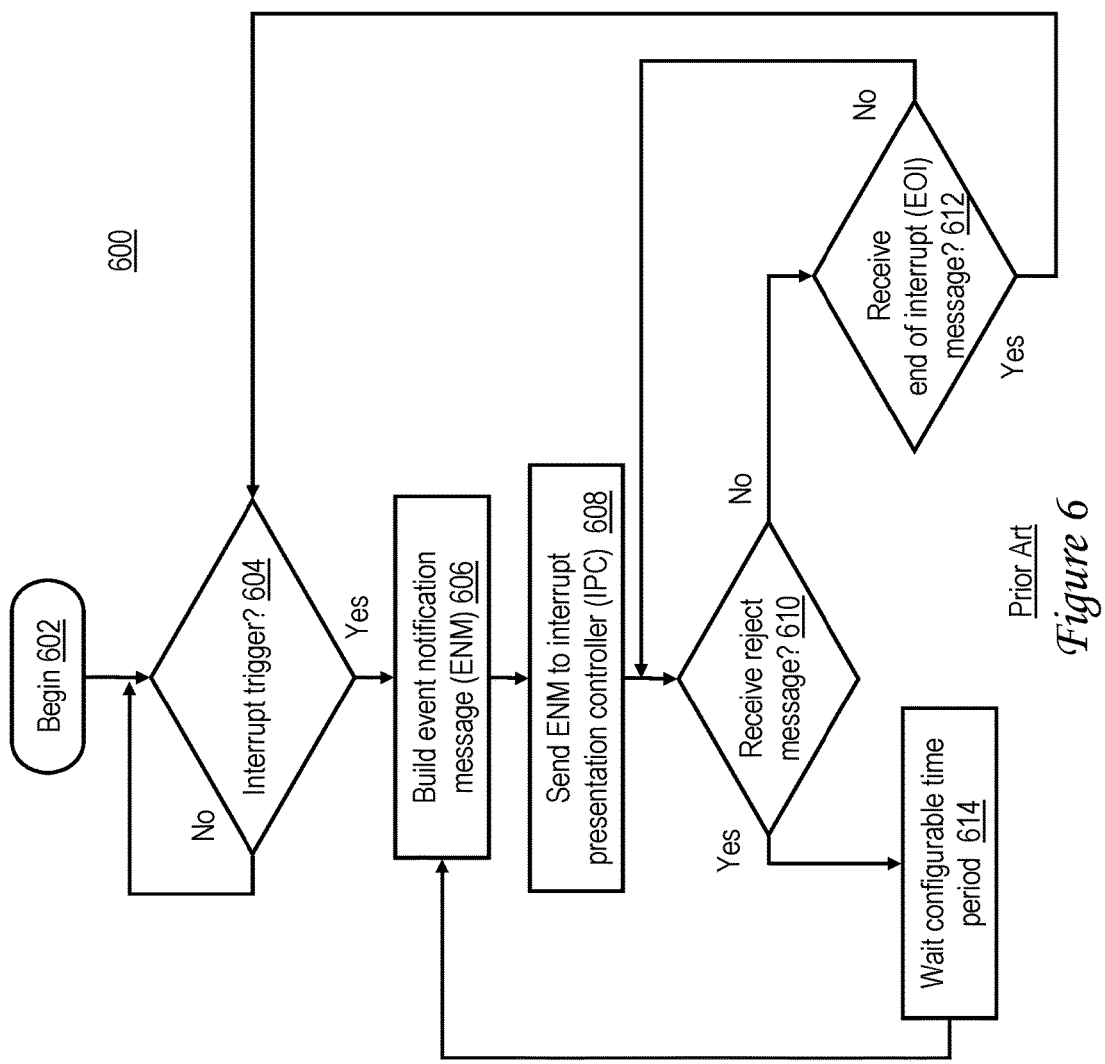
FIG. 6 is a flowchart of an exemplary process implemented by a conventional ISC to handle interrupts.

With reference to FIG. 6 an exemplary process 600 is illustrated that is implemented by ISC 424 to handle interrupts. Process 600 may, for example, be initiated in block 602 when ISC 424 receives input via I/O bus 414. Next, in decision block 604, ISC 424 determines whether the received input corresponds to an interrupt trigger (or interrupt trigger pulse). In response to the received input not being an interrupt trigger control loops on block 604. In response to the received input being an interrupt trigger in block 604 control transfers to block 606. In block 606, ISC 424 builds an ENM 302 based on associated information in EAT 426. Next, in block 608, ISC 424 sends ENM 302 to IPC 540 via memory I/O bus 410.

Then, in decision block 610, ISC 424 determines whether a reject message (i.e., an NRM 304) has been received from IPC 540. For example, IPC 540 may generate an NRM 304 in response to a physical processor thread that is designated to be interrupted to service the interrupt having a higher operating priority than an event priority of the interrupt. In response to ISC 424 receiving an NRM 304 for ENM 302 in block 610 control transfers to block 614, where process 600 waits a configurable time period before returning control to block 606 where another ENM 302 is built for the interrupt. In response to ISC 424 not receiving an NRM 304 for ENM 302 in block 610 control transfers to decision block 612. In block 612, ISC 424 determines whether an EOI message 306 has been received from IPC 540. In response to ISC 424 receiving an EOI message 306 for ENM 302 in block 612 control returns to block 604. In response to ISC 424 not receiving an EOI message 306 for ENM 302 in block 612 control returns to block 610.

Figure 7:
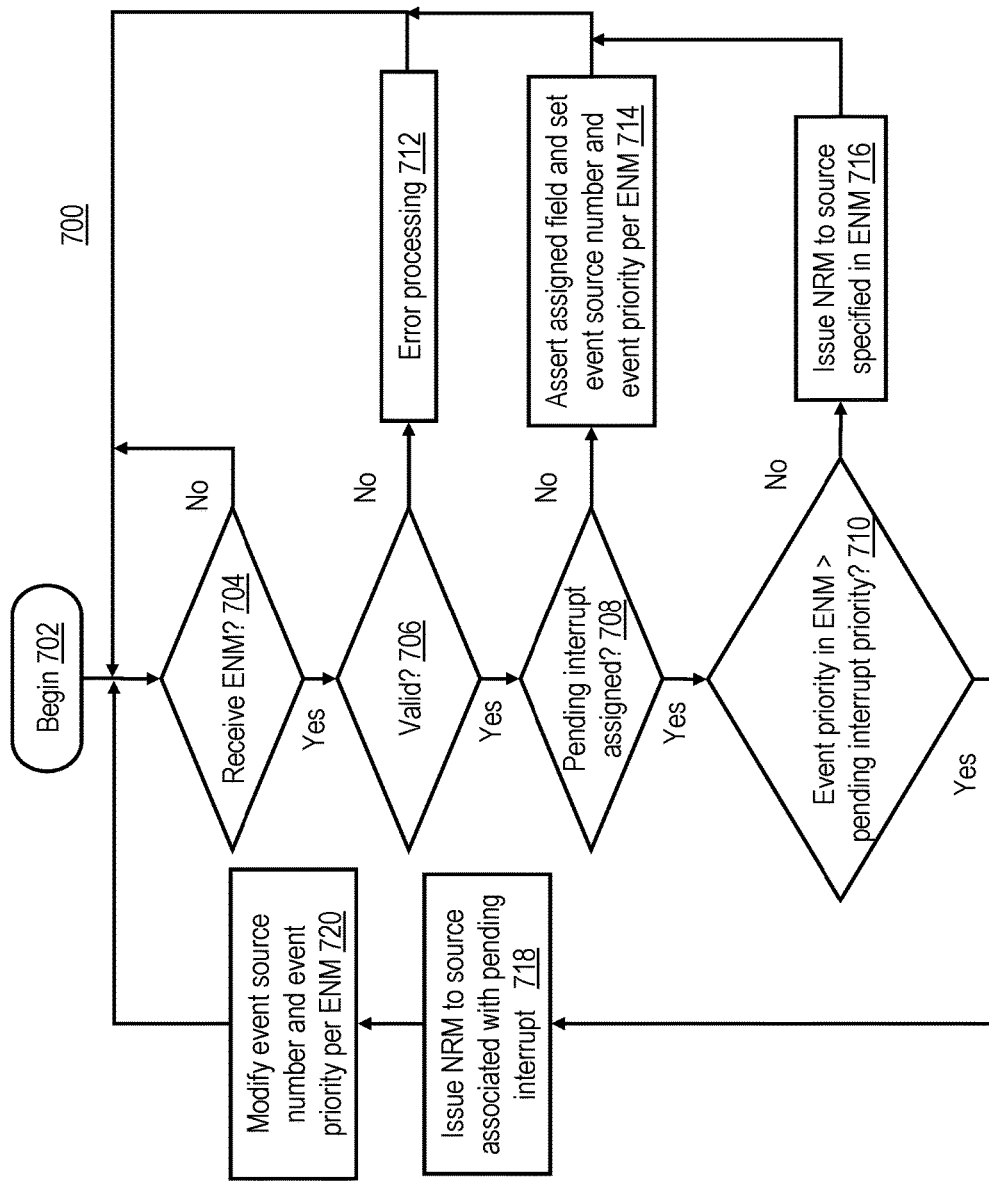
FIG. 7 is a flowchart of an exemplary process implemented by a conventional IPC to handle interrupts.

With reference to FIG. 7 an exemplary process 700 is illustrated that is implemented by IPC 540 to handle interrupts. Process 700 maybe initiated in block 702 when IPC 540 receives input via memory I/O bus 410. Next, in decision block 704, IPC 540 determines whether an ENM 302 was received. In response to the received input not being an ENM 302 control loops on block 704. In response to the received input being an ENM 302 in block 704 control transfers to decision block 706. In block 706, IPC 540 determines whether a valid bit for a row in ICT 542 that is assigned to an event target number (i.e., physical processor thread) specified in ENM 302 is asserted (i.e., whether the specified physical processor thread is populated and operational, as specified by a valid field of the physical processor thread in ICT 542).

In response to the valid bit not being asserted in block 706 control transfers to block 712, where error processing is initiated, and then returns to block 704. In response to the valid bit being asserted in block 706 control transfers to decision block 708. In block 708, IPC 540 determines whether a pending interrupt is already assigned to a physical processor thread associated with the event source number (by examining a value of an 'assigned' field of the specified physical processor thread in ICT 542). In response to a pending interrupt not already being assigned to the specified physical processor thread in block 708 control transfers to block 714. In block 714 IPC 540 asserts the 'assigned' field, and sets the 'event source number' field, and the 'event priority' field for the specified physical processor thread based on values included in ENM 302. Following block 714 control returns to block 704.

In response to a pending interrupt already being assigned to the physical processor thread in block 708 control transfers to decision block 710. In block 710 IPC 540 determines whether an event priority of a new interrupt, as specified in the 'event priority' field of ENM 302, is greater than an event priority of an already pending interrupt, as specified in the 'event priority' field of the physical processor thread in ICT 542. In response to the event priority of the new interrupt not being greater than the event priority of the pending interrupt control transfers from block 710 to block 716. In block 716 IPC 540 issues an NRM 304 to the event source number specified in ENM 302 (i.e., the source associated with the new interrupt).

In response to the event priority of the new interrupt being greater than the event priority of the pending interrupt control transfers from block 710 to block 718. In block 718 IPC 540 issues an NRM 304 to the event source number specified in ICT 542 (i.e., the source associated with the pending interrupt). Next, in block 720, IPC 540 modifies the event source number and the event priority, as specified in ENM 302, for the physical processor thread in ICT 542. Following block 720 control returns to block 704.

Figure 8:
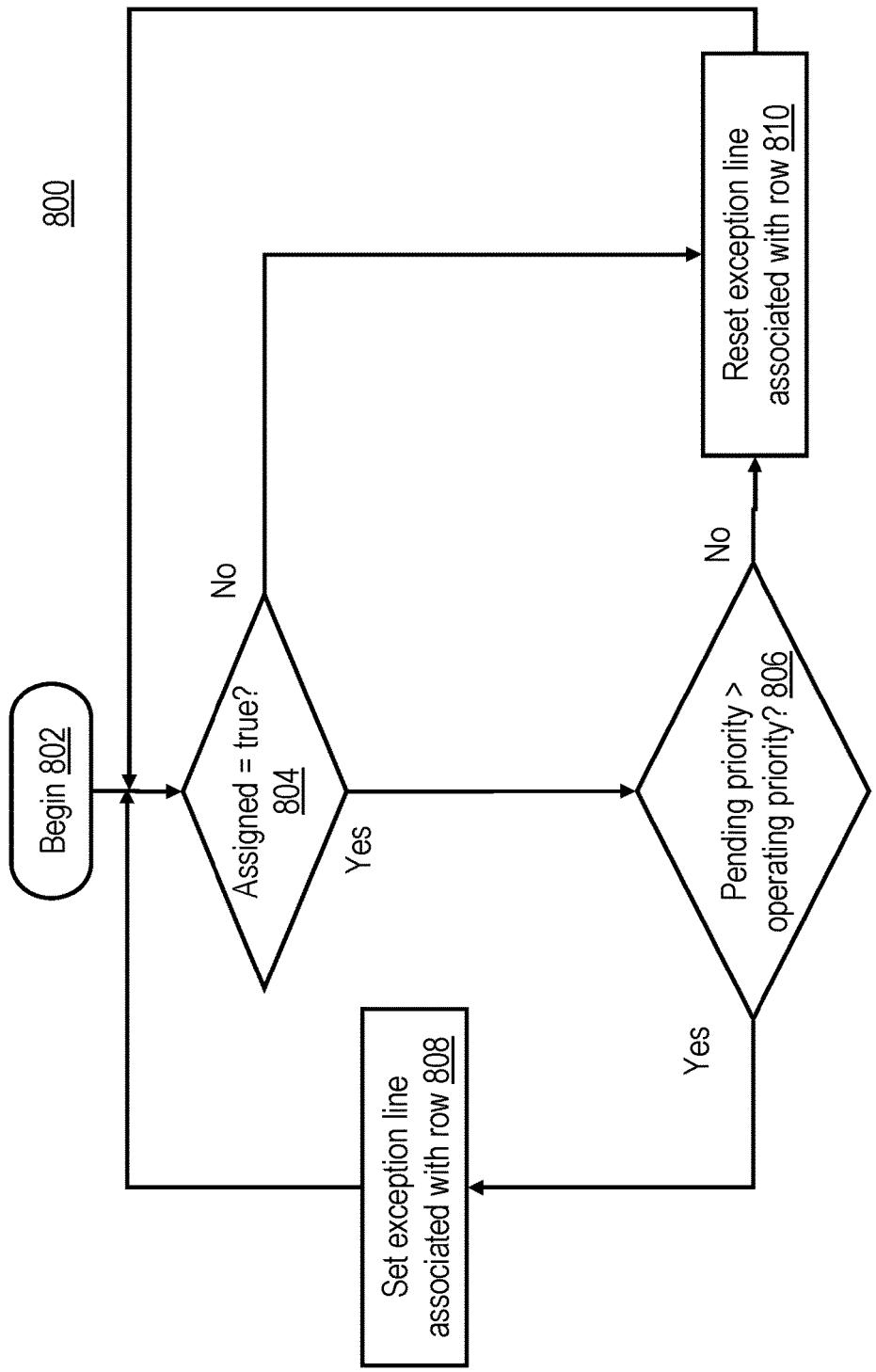
FIG. 8 is a flowchart of another exemplary process implemented by a conventional IPC to handle interrupts.

With reference to FIG. 8 an exemplary process 800 is illustrated that is implemented by IPC 540 to assert/deassert exception lines based on associated 'assigned' fields being asserted (indicating a pending interrupt) and an event priority for the pending interrupt being greater than (or less than or equal to) an operating priority of a physical processor thread that is to be interrupted to facilitate servicing the interrupt by an associated processor core. Process 800 may be periodically initiated in block 802 by IPC 540 to determine whether exceptions lines to respective processor cores require assertion or de-assertion. Next, in decision block 804, IPC 540 determines whether an assigned field for each row in ICT 542 is asserted (i.e., true), which indicates that an interrupt is pending for an associated physical processor thread.

In response to an 'assigned' field not being asserted in a row of ICT 542 control transfers from block 804 to block 810. In block 810 IPC 540 deasserts an exception line associated with a row that was recently unassigned or maintains the exception line in a deasserted state for a row that is unassigned, but not recently unassigned. Following block 810 control returns to block 804. In response to an assigned field being asserted in a row of ICT 542 control transfers from block 804 to decision block 806. In block 806, IPC 540 determines whether an event priority of a pending interrupt is greater than an operating priority of an associated physical processor thread.

In response to the event priority of a pending interrupt not being greater than an operating priority of an associated physical processor thread in block 806 control transfers to block 810, where associated exception lines remain deasserted. In response to the event priority of a pending interrupt being greater than an operating priority of an associated physical processor thread in block 806 control transfers to block 808, where associated exception lines are asserted. Following block 808 control returns to block 804.

Figure 9:
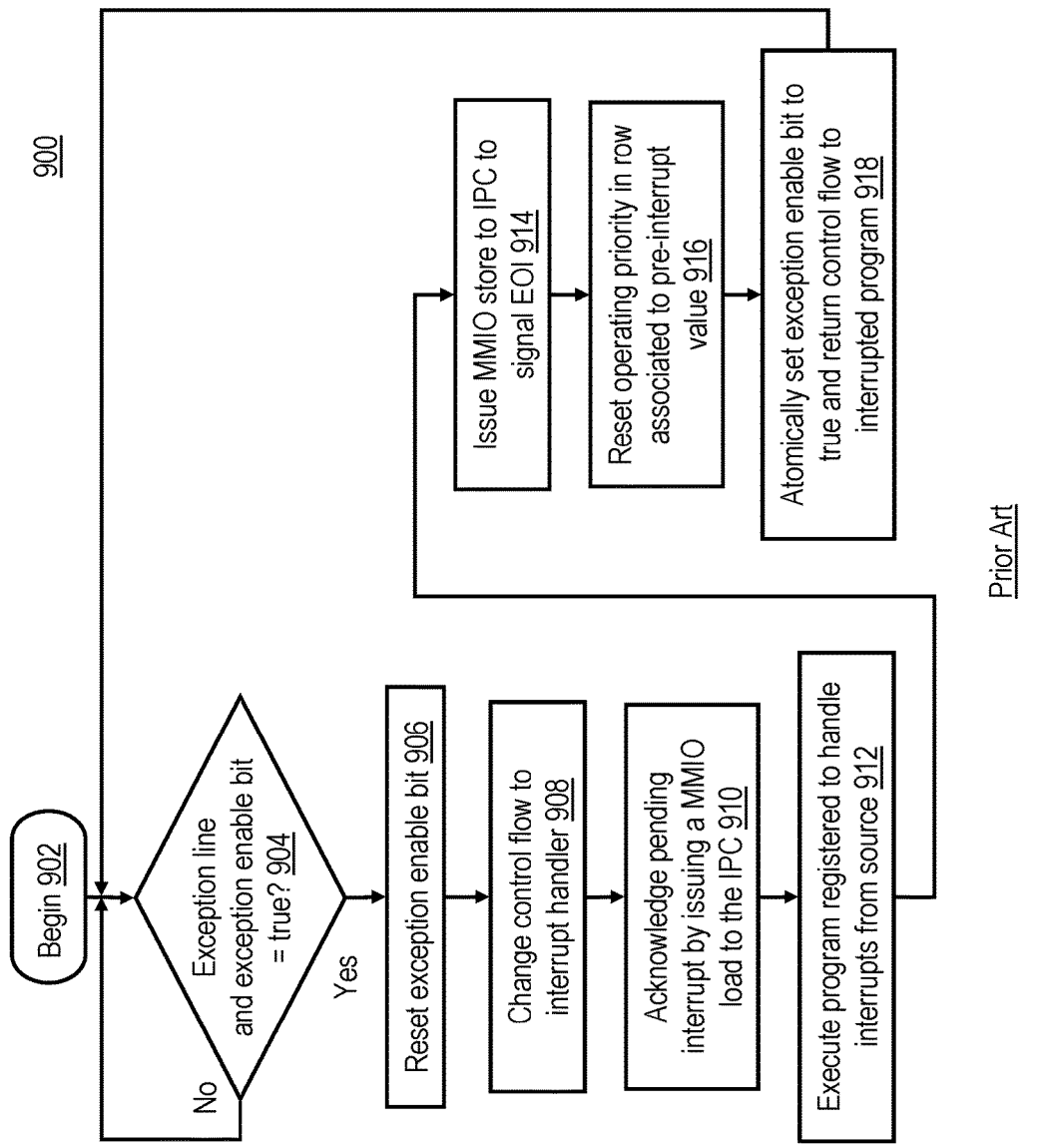
FIG. 9 is a flowchart of an exemplary process implemented by a conventional processor core to handle interrupts.

With reference to FIG. 9, an exemplary process 900 that is implemented by a processor core to handle interrupts is illustrated. It should be appreciated that each processor core maintains an exception enable bit (e.g., in an internal register) for each associated exception line. Process 900 may be periodically executed by a processor core to determine whether a physical processor thread should be interrupted to facilitate executing, by the processor core, an interrupt handler to service an interrupt. Process 900 is initiated in block 902 at which point control transfers to decision block 904. In block 904 the processor core determine whether both an exception line and an exception enable bit are asserted. A processor core masks interrupts by deasserting the exception enable bit.

In response to the exception line and/or the associated exception enable bit not being asserted control loops on block 904. In response to both the exception line and the associated exception enable bit being asserted control transfers from block 904 to block 906. In block 906 the processor core resets the exception enable bit (to prevent subsequent interrupts from interrupting the current interrupt). Next, in block 908, the processor core changes control flow to an appropriate interrupt handler. Next, the processor core acknowledges the pending interrupt by issuing a MMIO load to IPC 540. Then, in block 910, the processor core executes a program that is registered to handle interrupts from the source (specified by a value in the 'event source number' field).

Next, in block 914, following completion of the program, the processor core issues a MMIO store to IPC 540 to signal an EOI. Then, in block 916, the processor core, resets the operating priority in the row in ICT 542 that is associated with the physical processor thread to a pre-interrupt value. Next, in block 918, the processor core atomically asserts the exception enable bit and returns control flow to a program that was interrupted to service the interrupt. Following block 918 control returns to block 904.

Figure 10:
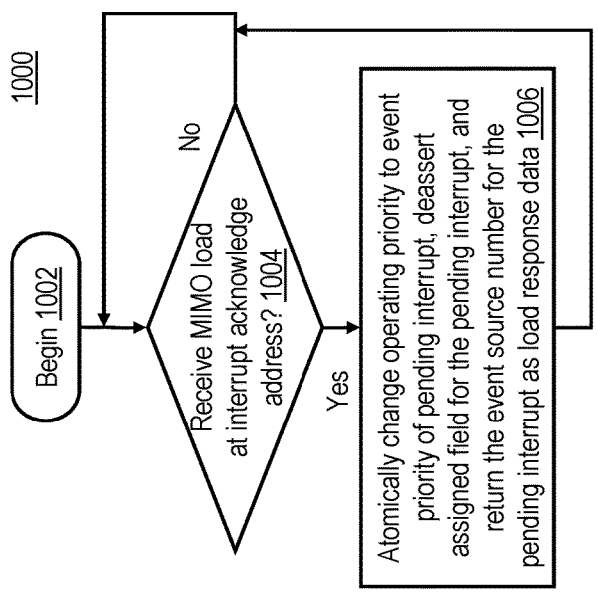
FIG. 10 is a flowchart of yet another exemplary process implemented by a conventional IPC to handle interrupts.

With reference to FIG. 10, an exemplary process 1000 that is implemented by IPC 540 to handle interrupts is illustrated. Process 1000 may be periodically executed by IPC 540 to determine whether IPC 540 has received a communication (e.g., MMIO load or a MMIO store) from a processor core with respect to a pending interrupt. Process 1000 is initiated in block 1002 at which point control transfers to decision block 1004. In block 1004 IPC 540 determines whether a MMIO load has been received at an interrupt acknowledge address.

In response to a MMIO load not being received at the interrupt acknowledge address control loops on block 1004. In response to a MMIO load being received at the interrupt acknowledge address control transfers to block 1006. In block 1006 IPC 540 atomically sets an operating priority to the pending interrupt priority and resets the assigned field for the interrupt in ICT 542, and returns the pending interrupt source number as response data to the MMIO load. From block 1006 control returns to block 1004.

Figure 11:
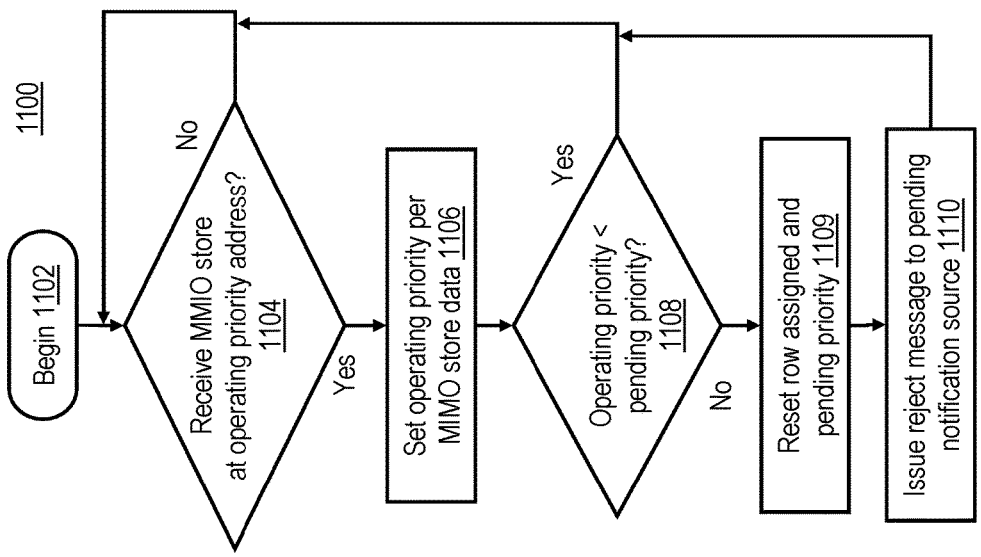
FIG. 11 is a flowchart of still another exemplary process implemented by a conventional IPC to handle interrupts.

With reference to FIG. 11, an exemplary process 1100 that is implemented by IPC 540, to handle changes in operating priority for a physical thread, is illustrated. Process 1100 may be periodically executed by IPC 540 to determine whether IPC 540 has received a communication (e.g., a MMIO load or a MMIO store) from a processor core with respect to a pending interrupt. Process 1100 is initiated in block 1102 at which point control transfers to decision block 1104. In block 1104 IPC 540 determines whether a MMIO store has been received at an operating priority address.

In response to a MMIO store not being received at the operating priority address control loops on block 1104. In response to a MMIO load being received at the operating priority address control transfers from block 1104 to block 1106. In block 1106, IPC 540 sets an operating priority for each row in ICT 542 per data associated with the MMIO store. Next, in decision block 1108, IPC 540 determines whether the operating priority is less than the pending priority for each row in ICT 542. In response to the operating priority being less that a pending event priority control transfers from block 1108 to block 1104. In response to the operating priority not being less than a pending event priority control transfers from block 1108 to block 1109 where the row assigned bit is reset along with the pending priority. Next, in block 1110, IPC 540 issues a reject message to a notification source associated with the pending interrupt. From block 1110 control returns to block 1104.

According to an embodiment of the present disclosure, techniques are implemented that may increase the number of virtual processor threads that are available to be interrupted by a given interrupt and, thus, increase the likelihood of a given interrupt being serviced in a more timely manner. In various embodiments, the techniques also specify a software stack level (e.g., a user level, an OS level, or a hypervisor level) to interrupt and, when a user level is to be interrupted, a process identifier (ID). According to other aspects of the present disclosure, an escalate message is introduced in conjunction with an escalate event number that replaces an original event source number. The escalate event number indicates a new event source number that is used to escalate the original event to a higher level in the software stack. As one example, an event may be escalated from a user level to an OS level or from an OS level to a hypervisor level.

With reference to FIG. 12A, a structure of an exemplary event notification message (ENM) 1202, that is configured according to the present disclosure, is illustrated. ENM 1202 includes a 'process ID' field, a 'level' field, an 'event target number' field, a 'number of bits to ignore' field, an 'escalate event number' field, an 'event source number' field, and an 'event priority' field, as well as a field (not shown) that identifies the message as an event notification message. A value in the 'process ID' field (when a user level interrupt is specified) identifies a user process to interrupt (e.g., thirty-two different user processes may be specified). A value in the 'level' field specifies whether the interrupt is a user level interrupt, an OS level interrupt, or a hypervisor level interrupt. A value in the 'event target number' field identifies a virtual processor (VP) thread that is designated to be interrupted to facilitate servicing of an associated interrupt by an associated processor core. A value in the 'number of bits to ignore' field specifies the number of lower-order bits to ignore in the 'event target number' when determining which VP threads may potentially be interrupted to service the interrupt. A value in the 'escalate event number' field identifies a new event source number that is to be utilized in the event a specified software stack (specified in the 'level' field) is not dispatched and an escalate message is generated by an interrupt presentation controller and received by an interrupt source controller. A value in the 'event source number' field identifies a notification source that generated the interrupt. A value in the 'event priority' field identifies a priority level of the interrupt.

ENM 1202 is generated by an interrupt source controller (ISC) 224 that is configured according to the present disclosure (see FIG. 14) and issued to an interrupt presentation controller (IPC) 240 that is configured according to the present disclosure (see FIG. 15) to indicate that a notification source, identified by the 'event source number' field, has generated the interrupt. ENM 1202 may also be generated by ISC 224 when an interrupt is to be escalated to a higher level. It should be appreciated that ENM 1202 is similar to ENM 302, with some exceptions being that ENM 1202 includes an additional field that specifies a 'process ID' for a user level interrupt, an additional field that specifies a 'level' (i.e., a user level, an OS level, or a hypervisor level) of a software stack that an interrupt is directed at, an additional field that specifies a 'number of bits to ignore' that is used when selecting a virtual processor (VP) thread to interrupt, an additional field that specifies an 'event escalate number', and that the 'event target value' field identifies a virtual processor thread, as contrasted with a physical processor thread.

For example, assuming that sixteen VP threads are implemented (i.e., VP threads 0000 through 1111) the number of VP threads that may be considered for interruption may be specified as a single VP thread or all sixteen VP threads depending on a value specified in the 'number of bits to ignore' field. As one example, assuming that VP thread eight, i.e., '1000', is specified in the 'event target number' field and that three is specified in the 'number of bits to ignore' field, then eight VP threads (i.e., '1000' through '1111') may be considered for interruption to service an associated interrupt. As another example, assuming that VP thread eight, i.e., '1000', is specified in the 'event target number' field and that zero is specified in the 'number of bits to ignore' field, then only VP thread eight (i.e., '1000') may be considered for interruption to service an associated interrupt.

With reference to FIG. 12B, a structure of an exemplary escalate message 1204, that is configured according to the present disclosure, is illustrated. Escalate message 1204 includes an 'escalate event number' field, as well as a field (not shown) that identifies the message as an escalate message. Escalate message 1204 is sourced by IPC 240 and received by ISC 224. In response to receiving the escalate message, ISC 224 builds a new ENM 1202 that uses a value provided in the 'escalate event number' field as the event source number for the new ENM 1202.

With reference to FIG. 13, a graph 1300 is illustrated that depicts a relationship between the number of (lower-order) bits to ignore and virtual processor (VP) threads that may potentially service an associated interrupt for a data processing system that deploys up to sixteen VP threads, according to an embodiment of the present disclosure. It should be appreciated that the disclosed techniques are applicable to data processing systems that deploy more or less than sixteen VP threads. As is illustrated in graph 1300, when the 'number of bits to ignore' is four all sixteen VP threads are potentially available to service an associated interrupt. When the 'number of bits to ignore' is three, eight VP threads are potentially available to service an associated interrupt. When the 'number of bits to ignore' is two, four VP threads are potentially available to service an associated interrupt. When the 'number of bits to ignore' is one, two VP threads are potentially available to service an associated interrupt. When the 'number of bits to ignore' is zero, one VP thread is potentially available to service an associated interrupt. In general, where the 'number of bits to ignore' is 'n' bits, a specified virtual processor thread and $2^n-1$ other virtual processor threads may be potentially interrupted.

Figure 14:
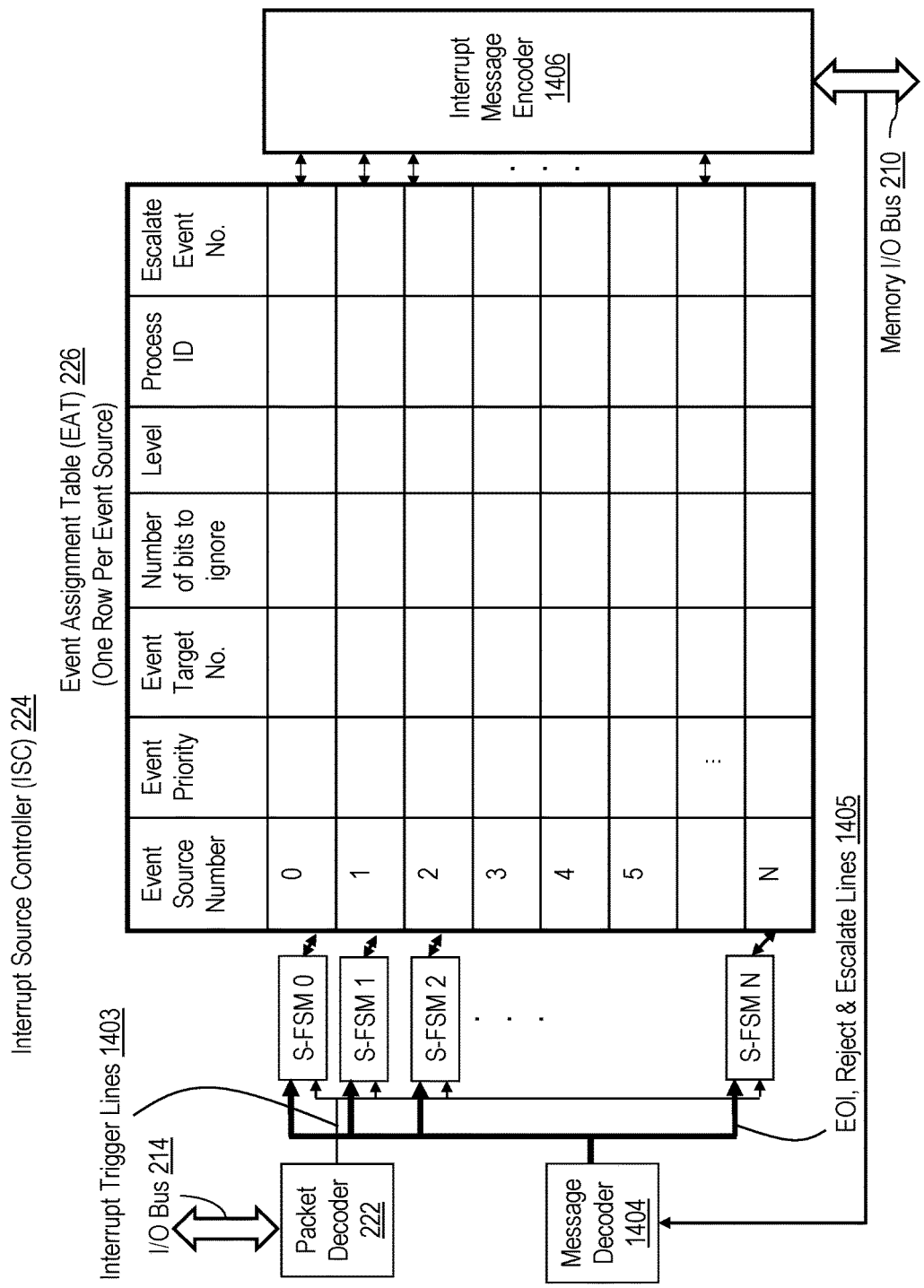
FIG. 14 is a block diagram of relevant components of an exemplary ISC configured according to the present disclosure.

With reference to FIG. 14, relevant components of ISC 224 of FIG. 2, which is configured according to the present disclosure, are further illustrated. As previously mentioned, interrupt controller 220 includes packet decoder 222, which is coupled to I/O bus 214, and ISC 224. ISC 224 includes a message decoder 1404 (that is used to decode conventional EOI messages 306 and/or NRMs 304 and escalate messages 1204 received via memory I/O bus 210), event assignment table (EAT) 226, and an interrupt message encoder 1406 that utilizes appropriate information in EAT 226 to generate ENMs 1202 for a source. Packet decoder 222 is configured to decode packets received via I/O bus 214 and select a finite state machine (FSM) to process the received packet based on an event source number for a source of the packet.

As is illustrated, ISC 224 includes an FSM for each row (i.e., S-FSM 0 through S-FSM N) in EAT 226 that is configured to maintain information in EAT 226 to facilitate building ENMs 1202. In one embodiment, a different set of FSMs (not shown) is implemented to handle the generation of ENMs 1202 in response to escalate messages 1204. It should be appreciated that the event source number illustrated in EAT 226 is not a field, but is only used to indicate a row number. For example, source number '0' is assigned to row number '0' of EAT 226, source number '1' is assigned to row number '1' of EAT 226, etc. In EAT 226, each row has an associated 'event priority' field, an 'event target number' field, a 'number of bits to ignore' field, a 'level' field, a 'process ID' field, and an 'escalate event number' field, whose values are utilized to populate corresponding fields in an ENM 1202, which is generated by interrupt message encoder 1406 when an interrupt is requested by an associated I/O device.

Figure 15:
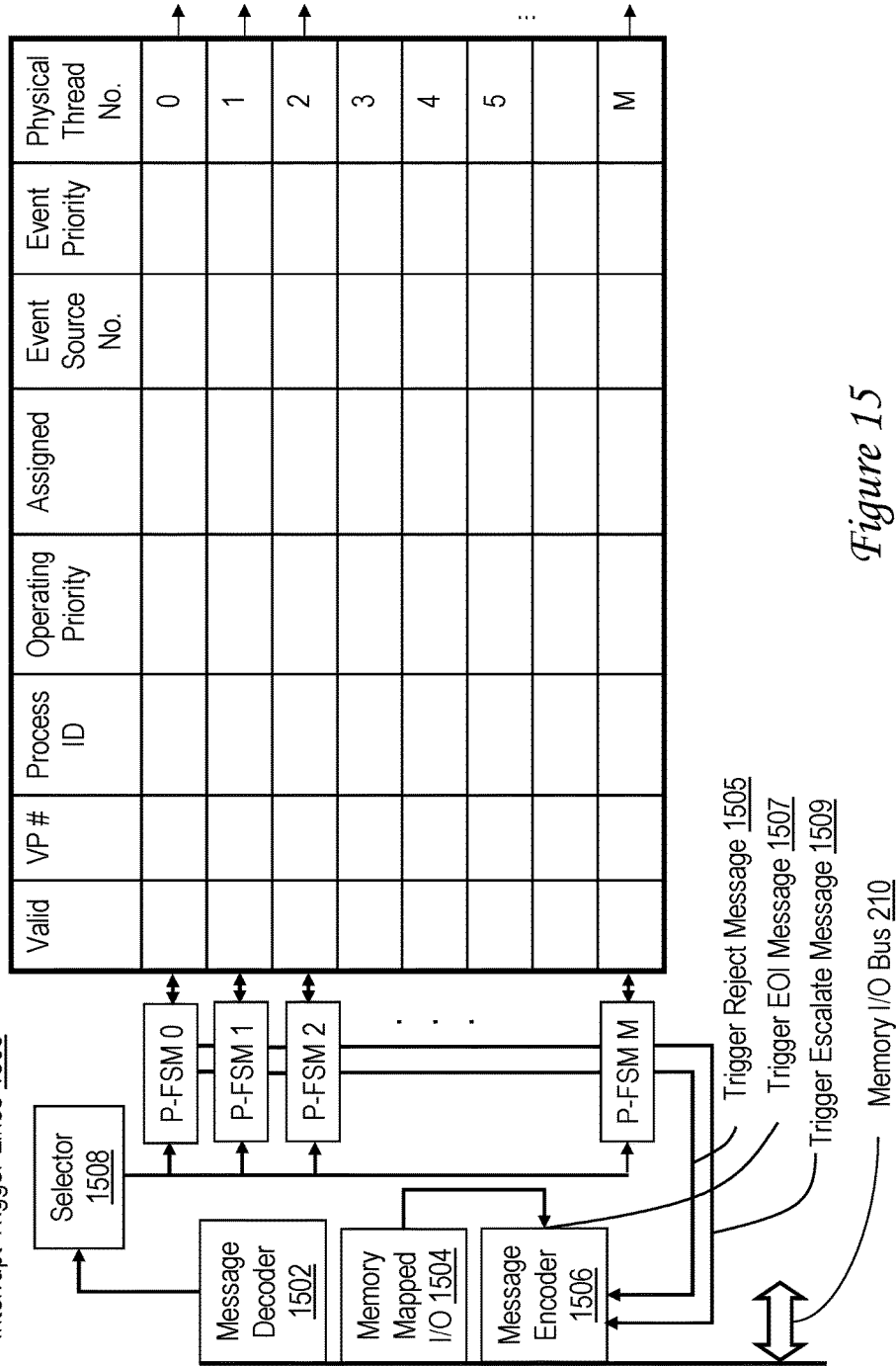
FIG. 15 is a block diagram of relevant components of an exemplary IPC configured according to the present disclosure.

With reference to FIG. 15, relevant components of IPC 240 are further illustrated. IPC 240 includes a message decoder 1502, a memory mapped I/O (MMIO) unit 1504, and a message encoder 1506 coupled to memory I/O bus 210. Processor cores 200 communicate with IPC 240 via MMIO unit 1504, using MMIO loads and MMIO stores. IPC 240 receives messages from ISC 224 via message decoder 1502. IPC 240 generates messages for ISC 224 via message encoder 1506. MMIO unit 1504 issues a trigger EOI message 1507 to message encoder 1506 to cause message encoder 1506 to generate and send an EOI message 306 on memory I/O bus 210 to ISC 224. Message decoder 1502 is coupled to selector 1508, which is configured to select an FSM (i.e., one of P-FSM 1 through P-FSM M) for packet processing based on an event target number associated with a received ENM 1202. FSMs of IPC 240 access interrupt context table (ICT) 242 to initiate generation of an exception to a physical thread executing on a processor core 200 and to generate a trigger reject message 1505, which generates an NRM 304 in response to trigger reject message 1505. An escalate message 1204 is generated in response to trigger escalate message 1509 using an escalate event number provided by ISC 224 in ENM 1202.

It should be appreciated that the physical processor thread number illustrated in ICT 242 is not a field, but is only used to indicate a row. For example, physical (processor) thread number '0' is assigned to row number '0' of ICT 242, physical thread number '1' is assigned to row number '1' of ICT 242, etc. In ICT 242, each row has an associated 'valid' field, virtual processor number ('VP #') field, 'process ID' field (used for user level interrupts), an 'operating priority' field, an 'assigned' field, a 'source number' field, and an 'event priority' field, whose values may be retrieved by a processor core using a MMIO load in response to an exception line being asserted by IPC 240. The 'valid' field indicates whether a processor is installed and powered on and whether a VP is dispatched and operating on an associated physical processor thread. The 'VP #' field specifies a number of the VP that is dispatched on the associated physical processor thread. The 'process ID' field specifies a process ID for a user level interrupt. The 'operating priority' field specifies a priority level of a program currently running on the associated physical processor thread.

With reference to FIG. 16A, ICT 242 is further illustrated as including three different ICTs (i.e., a hypervisor stack level ICT 242a, an OS stack level ICT 242b, and a user stack level ICT 242c), each of which has different associated exception lines 212a, 212b, and 212c routed to processor cores 200. In at least one embodiment, only ICT 242c has a 'process ID' field.

Figure 16B:
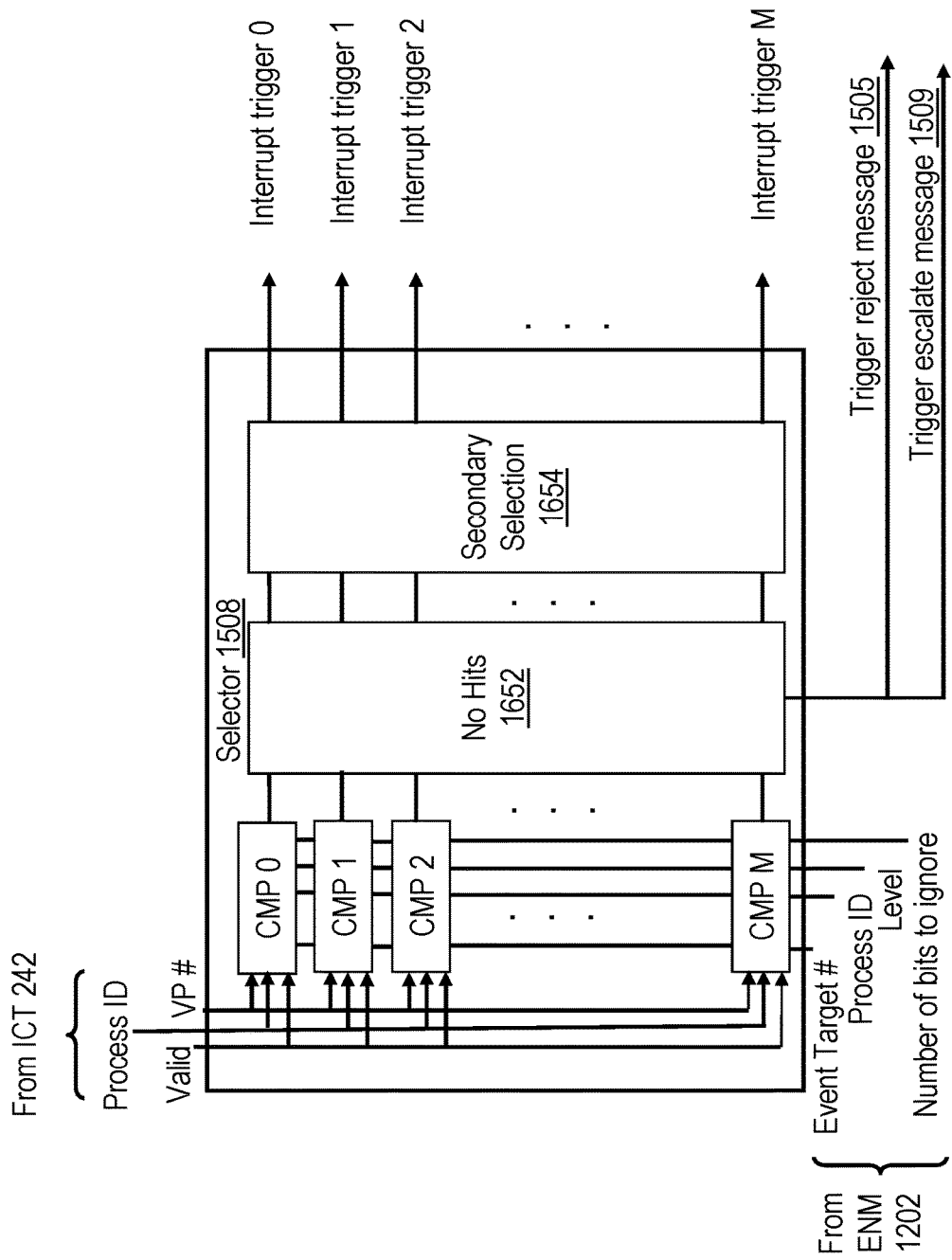
FIG. 16B is a block diagram of relevant components of an exemplary selector of the IPC of FIG. 15.

With reference to FIG. 16B, relevant components of selector 1508 of IPC 240 of FIG. 15 are further illustrated, according to one embodiment of the present disclosure. As is depicted, selector 1508 include comparators (CMP 0 through CMP M), i.e., one for each row in ICT 242, that compare an 'event target number', a 'process ID' for user level interrupts, a 'level', and 'number of bits to ignore' provided in ENM 1202 and 'valid', 'process ID' for user level interrupts, and 'VP #' values stored in respective rows of an appropriate one of ICTs 242a, 242b, or 242c. Outputs of the comparators are provided to a 'no hits' unit 1652 which determines whether any VP threads are available to be interrupted (when the interrupt is a user level interrupt the process IDs are also compared). In the event zero VP threads are available to be interrupted, 'no hits' unit 1652 issues trigger reject message 1505 (and may issue trigger escalate message 1509 to cause escalate message 1204 to be generated using an escalate event number provided from ISC 224 in ENM 1202) to message encoder 1506 (see FIG. 15). In the event more than one VP thread is available to be interrupted, 'secondary selection' unit 1654 determines which VP thread should be interrupted and issues an appropriate interrupt trigger to trigger an interrupt on an associated physical processor thread.

'Secondary selection' unit 1654 may implement various secondary selection criteria in determining which available VP thread to select for interruption. For example, 'secondary selection' unit 1654 may select a VP thread to interrupt based on 'event priority' relative to 'operating priority', least recently used (LRU), and/or random, etc. It should be appreciated that the various selection criteria may be implemented in series to select a single VP thread when multiple VP threads are still available after a given selection process.

Figure 16C:
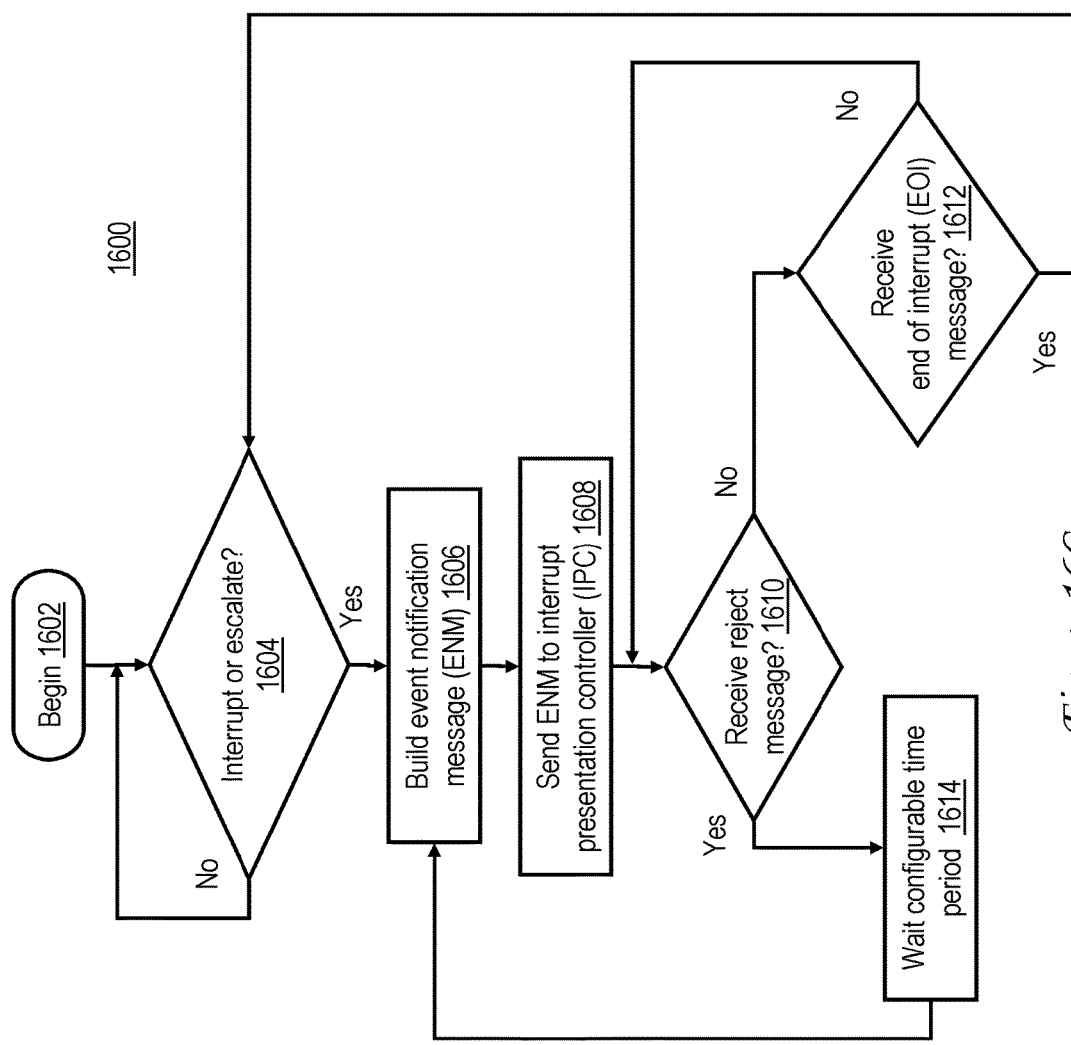
FIG. 16C is a flowchart of an exemplary process implemented by an ISC, configured according to an embodiment of the present disclosure, to handle interrupts.

With reference to FIG. 16C an exemplary process 1600 is illustrated that is implemented by ISC 224 to handle interrupts. Process 1600 may, for example, be initiated in block 1602 when ISC 224 receives input via I/O bus 214 or via memory I/O bus 210. Next, in decision block 1604, ISC 224 determines whether the received input corresponds to an interrupt trigger (or interrupt trigger pulse) or a trigger escalate message 1509. In response to the received input not corresponding to an interrupt trigger or escalate message 1509 control loops on block 1604. In response to the received input being an interrupt trigger or escalate message 1509 in block 1604 control transfers to block 1606. In block 1606, ISC 224 builds an ENM 1202 based on associated information in EAT 226. It should be appreciated that when the received input is an escalate message 1509 with an associated escalate event number the escalate event number is utilized as the event source number in building a new ENM 1202. Next, in block 1608, ISC 224 sends ENM 1202 to IPC 240 via memory I/O bus 210.

Then, in decision block 1610, ISC 224 determines whether a reject message (i.e., an NRM 304) has been received from IPC 240. For example, IPC 240 may generate an NRM 304 in response to a physical processor thread that is designated to be interrupted to service the interrupt having a higher operating priority than an event priority of the interrupt. In response to ISC 224 receiving an NRM 304 for ENM 1202 in block 1610 control transfers to block 1614, where process 1600 waits a configurable time period before returning control to block 1606 where another ENM 1202 is built for the interrupt. In response to ISC 224 not receiving an NRM 304 for ENM 1202 in block 1610 control transfers to decision block 1612. In block 1612, ISC 224 determines whether an EOI message 306 has been received from IPC 240. In response to ISC 224 receiving an EOI message 306 for ENM 1202 in block 1612 control returns to block 1604. In response to ISC 224 not receiving an EOI message 306 for ENM 1202 in block 1612 control returns to block 1610.

Figure 17:
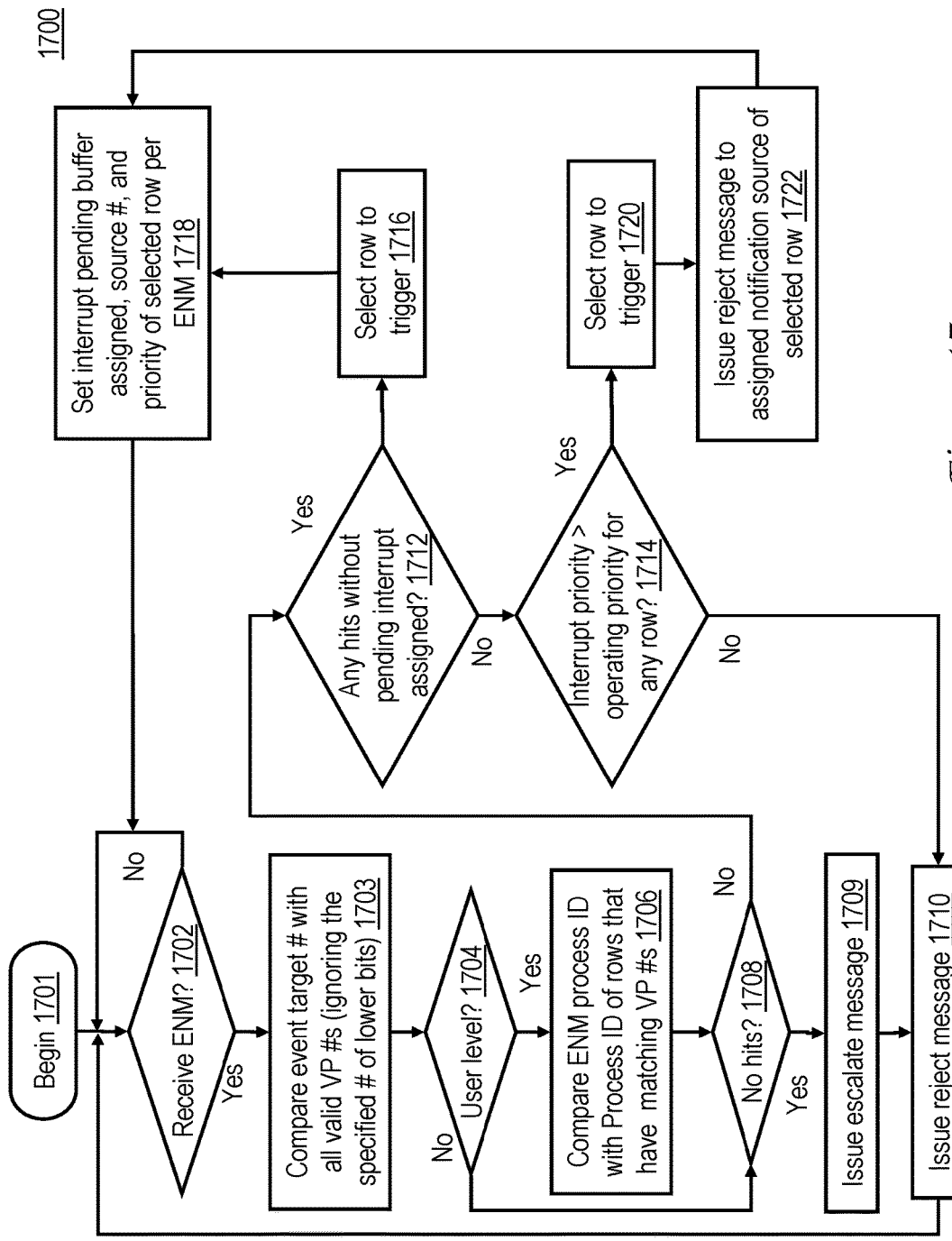
FIG. 17 is a flowchart of an exemplary process implemented by an IPC, configured according to the present disclosure, to handle interrupts.

With reference to FIG. 17 an exemplary process 1700 is illustrated that is implemented by IPC 240 to handle interrupts. It should be appreciated that IPC 240 handles event notification messages differently from how IPC 540 handles event notification messages (see FIG. 7). Process 1700 is initiated in block 1701 when IPC 240 receives input via memory I/O bus 210. Next, in decision block 1702, IPC 540 determines whether an event notification message (ENM) 1202 was received. It should be appreciated ISC 224 operates similarly to ISC 424 (see FIG. 6) and that ENM 1202 is built by ISC 224 in a manner that is similar to the manner described for ISC 424 to build ENM 302, with the exception that ENM 1202 is built to include an additional 'process ID' field, an additional 'level' field, an additional 'number of bits to ignore' field, and an additional 'escalate event number' field, and the 'event target number' field provides a virtual processor thread number, as contrasted with a physical processor thread number. In response to the received input not corresponding to an ENM 1202 control loops on block 1702. In response to the received input corresponding to an ENM 1202 in block 1702 control transfers to block 1703.

In block 1703, IPC 240 compares the 'event target number' from ENM 1202 with all valid VP numbers, ignoring the number of lower-order bits specified (in the 'number of bits to ignore' field) by ENM 1202. Next, in decision block 1704, IPC 240 determines whether the 'level' field indicates that the interrupt is a user level interrupt. In response to the interrupt being a user level interrupt control transfers from block 1704 to block 1706. In block 1706 IPC 240 compares the 'process ID' of ENM 1202 with 'process IDs' of rows in ICT 242c with matching valid VP numbers. From block 1706 control transfers to decision block 1708. In response to the interrupt not being a user level interrupt in block 1704 control transfers directly to block 1708.

In block 1708 IPC 240 determines whether a hit occurred for at least one VP thread. In response to no hits (i.e., no VP threads being available to be interrupted due to no VP thread being valid that meets the VP selection criteria (i.e., specified in the 'event target number' field and the 'number of bits to ignore' field) with the specified process ID for a user level interrupt) occurring in block 1708 control transfers to block 1709, where IPC 240 issues an escalate message (to escalate the interrupt to a next higher software stack level, assuming a higher level is available) with an associated escalate event number provided by ISC 224 in ENM 1202. Next, in block 1710, IPC 240 issues a reject message (i.e., NRM 304) to a notification source specified by the 'event source number' field in ENM 1202. It should be appreciated that various techniques may be employed to ensure that an associated interrupt that is rejected is eventually serviced. Following block 1710 control returns to block 1702. In response to at least one hit occurring in block 1708 control transfers to decision block 1712, where IPC 240 determines whether there are any hits that do not have a pending interrupt already assigned.

In response to IPC 240 determining that there is at least one hit that does not already have a pending interrupt assigned in block 1712 control transfers to block 1716. In block 1716, IPC 240 selects (based on event priority' relative to 'operating priority', least recently used (LRU), and/or random, etc) a row in ICT 242 to trigger an interrupt. Next, in block 1718, IPC 240 sets an 'assigned' field, a 'source number' field, and an 'event priority' field of the selected row per ENM 1202. Following block 1718 control returns to block 1702. In response to IPC 240 determining that there are no hits that do not already have a pending interrupt assigned in block 1712 control transfers to decision block 1714. In block 1714, IPC 240 determines whether an interrupt priority (i.e., the event priority) of ENM 1202 is greater than an operating priority of any row with a hit that has a pending interrupt.

In response to the interrupt priority not being greater than an operating priority of any row with a hit that has a pending interrupt control transfers from block 1714 to block 1710. In response to the interrupt priority being greater than an operating priority of at least one row with a hit that has a pending interrupt control transfers from block 1714 to block 1720. In block 1720, IPC 240 selects (based on event priority' relative to 'operating priority', least recently used (LRU), and/or random, etc) a row in ICT 242 to trigger an interrupt. Next, in block 1722, IPC 240 issues a reject message to an assigned notification source of the selected row in ICT 242. Then, in block 1718, IPC 240 sets an 'assigned' field, a 'source number' field, and an 'event priority' field of the selected row in ICT 224 per ENM 1202. Following block 1718 control returns to block 1702.

Figure 18:
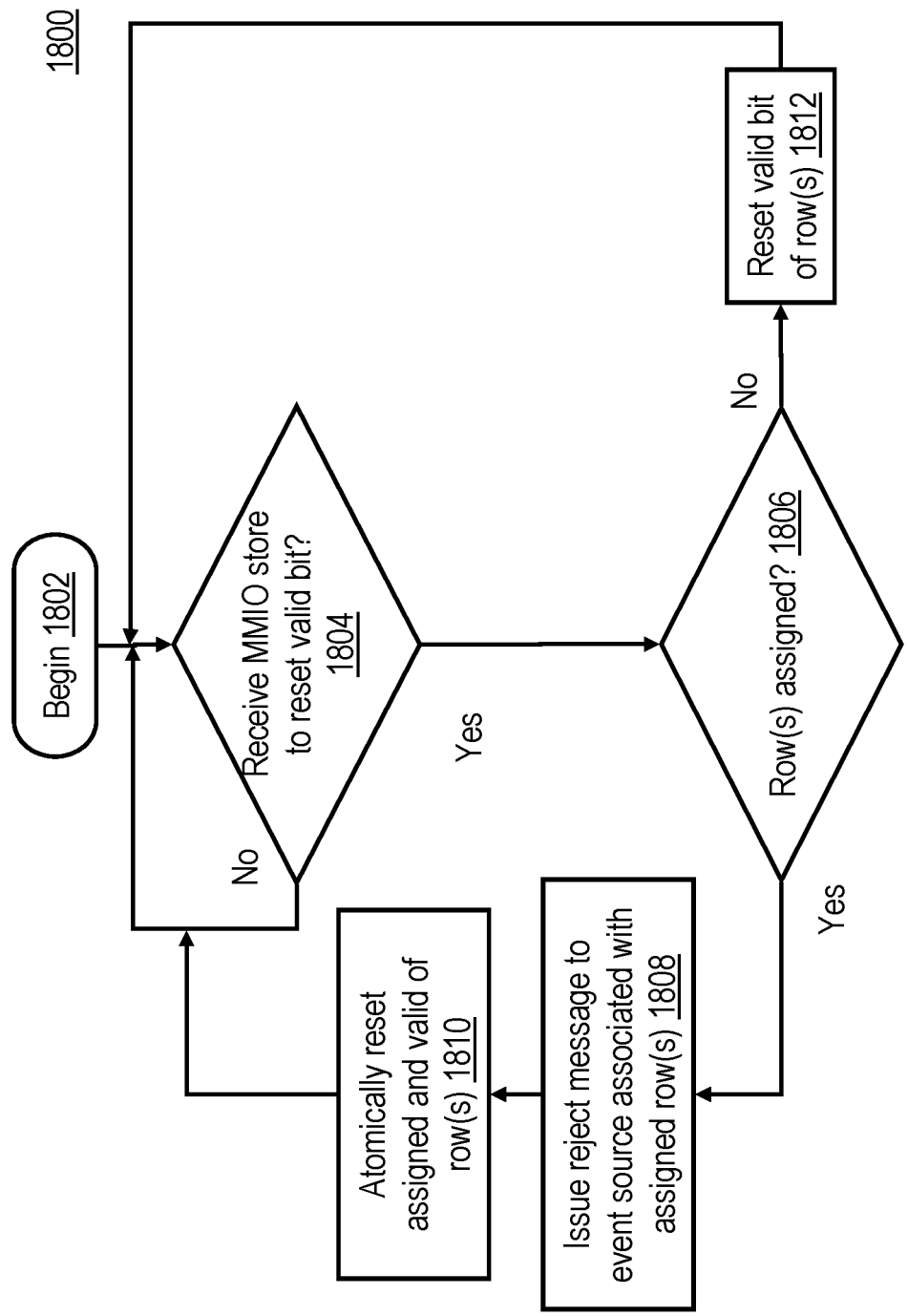
FIG. 18 is a flowchart of another exemplary process implemented by an IPC, configured according to the present disclosure, to handle interrupts.

With reference to FIG. 18 an exemplary process 1800 is illustrated that is implemented by IPC 240 to handle certain MMIO stores received from a processor core. For example, a processor core 200 may issue a MMIO store to IPC 242 to invalidate all associated VPs. Process 1800 is initiated in block 1802 when, for example, IPC 240 receives a MMIO store from a given processor core 200. Next, in decision block 1804, IPC 240 determines whether the MMIO store is directed to deasserting a valid bit in one or more rows in ICT 242. In response to the received MMIO store not being directed to deasserting a valid bit in one or more rows in ICT 242 control loops on block 1804. In response to the received MMIO store being directed to deasserting a valid bit in one or more rows in ICT 242 control transfers from block 1804 to decision block 1806.

In decision block 1806, IPC 240 determines whether the assigned bit is asserted in a row, i.e., whether an interrupt is pending for a row whose valid bit is to be deasserted. In response to the assigned bit being asserted for a row control transfers to block 1808. In block 1808 IPC 240 issues a reject message to a notification source (specified by a value in an 'event source number' field of a row in ICT 242) associated with the row to which the valid bit is to be deasserted. Next, in block 1810 IPC 240 atomically deasserts values in the 'assigned' field and the 'valid' field associated with the row (to indicate that an interrupt is no longer pending for the row or rows and that the row or rows do not have a valid VP). Following block 1810 control returns to block 1804. In response to the assigned bit not being asserted for a row or rows in block 1806 control transfers to block 1812. In block 1812 IPC 240 deasserts the valid bit for the row or rows. Following block 1812 control returns to block 1804.

Accordingly, techniques have been disclosed herein that generally improve the servicing of interrupts and allow an I/O device to specify a level (e.g., a user level, an OS level, a hypervisor level) of an interrupt. According to other aspects of the present disclosure, an escalate message is introduced in conjunction with an escalate event number that replaces an original event source number. The escalate event number indicates the event source number that is to be used to escalate the original event to a next higher software stack level. It should be appreciated that aspects of the present disclosure may be implemented in a design structure that is tangibly embodied in a computer-readable storage device for designing, manufacturing, or testing an integrated circuit.

In the flow charts above, the methods depicted in the figures may be embodied in a computer-readable medium as one or more design files. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system."

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of handling interrupts in a data processing system, the method comprising:
    receiving, at an interrupt presentation controller (IPC), an event notification message (ENM), wherein the ENM specifies a level, an event target number, and a non-zero number of bits to ignore;
    determining, by the IPC, a group of virtual processor threads that may be potentially interrupted based on the event target number, the number of bits to ignore, and a process identifier (ID) when the level specified in the ENM corresponds to a user level, wherein the event target number identifies a specific virtual processor thread and the number of bits to ignore identifies the number of lower-order bits to ignore with respect to the specific virtual processor thread when determining a group of virtual processor threads that may be potentially interrupted;
    determining whether virtual processor threads within the group of virtual processor threads are dispatched and operating on an associated physical processor;
    in response to determining multiple virtual processor threads within the group of virtual processor threads are dispatched and operating on an associated physical processor, selecting one of the multiple virtual processor threads to interrupt that does not already have a pending interrupt; and
    in response to no virtual processor thread within the group of virtual processor threads being dispatched and operating on an associated physical processor, transmitting, by the IPC, an escalate message, wherein the escalate message includes an escalate event number that is used by an interrupt source controller (ISC) to generate a subsequent ENM.

2. The method of claim 1, wherein the process ID is not used when the level corresponds to an operating system (OS) level.

3. The method of claim 1, the method further comprising:
    in response to no virtual processor thread within the group of virtual processor threads being dispatched and operating on an associated physical processor, issuing a reject message to a notification source designated by an event source number specified in the ENM.

4. The method of claim 1, further comprising:
    in response to more than one of the multiple virtual processor threads not already having a pending interrupt, selecting one of the multiple virtual processor threads to interrupt that does not already have a pending interrupt based on secondary selection criteria.

5. The method of claim 1, wherein the method further comprises:

in response to determining that all of multiple virtual processor threads within the group that are dispatched and operating on an associated physical processor have pending interrupts, determining whether an event priority specified in the ENM is greater than an operating priority of any of the multiple virtual processor threads; and in response to determining that the event priority is not greater than the operating priority of any of the multiple virtual processor threads, issuing a reject message to a notification source designated by an event source number specified in the ENM.

6. The method of claim 2, wherein the process ID is not used when the level corresponds to a hypervisor level.

7. The method of claim 4, wherein the secondary selection criteria includes one or more of an event priority, specified in the ENM, relative to an operating priority for each of the multiple virtual processor threads, a least recently used (LRU) one of the multiple virtual processor threads, and a random one of the multiple virtual processor threads.

8. The method of claim 5, further comprising:

in response to determining that the event priority is greater than the operating priority of any of the multiple virtual processor threads, selecting one of the multiple virtual processor threads to interrupt with the operating priority less than the event priority.

9. The method of claim 5, further comprising:

in response to determining that the event priority is greater than the operating priority of more than one of the multiple virtual processor threads, selecting one of the multiple virtual processor threads to interrupt with the operating priority less than the event priority based on secondary selection criteria.

10. The method of claim 9, wherein the secondary selection criteria includes one or more of the event priority relative to the operating priority for the multiple virtual processor threads, a least recently used (LRU) one of the multiple virtual processor threads, and a random one of the multiple virtual processor threads.

11. A processing unit for a multithreaded data processing system, the processing unit comprising:

an interrupt source controller (ISC); and an interrupt presentation controller (IPC) coupled to the ISC, wherein the IPC is configured to:

receive an event notification message (ENM) from the ISC, wherein the ENM specifies a level, an event target number, and a non-zero number of bits to ignore;

determine a group of virtual processor threads that may be potentially interrupted based on the event target number, the number of bits to ignore, and a process identifier (ID) when the level specified in the ENM corresponds to a user level, wherein the event target number identifies a specific virtual processor thread and the number of bits to ignore identifies the number of lower-order bits to ignore with respect to the specific virtual processor thread when determining a group of virtual processor threads that may be potentially interrupted;

determine whether virtual processor threads within the group of virtual processor threads are dispatched and operating on an associated physical processor;

in response to determining multiple virtual processor threads within the group of virtual processor threads are dispatched and operating on an associated physical processor, select one of the multiple virtual processor threads to interrupt that does not already have a pending interrupt; and in response to no virtual processor thread within the group of virtual processor threads being dispatched and operating on an associated physical processor, transmit an escalate message, wherein the escalate message includes an escalate event number that is used by the ISC to generate a subsequent ENM.

12. The processing unit of claim 11, wherein the IPC is further configured to:

in response to no virtual processor thread within the group of virtual processor threads being dispatched and operating on an associated physical processor, issue a reject message to a notification source designated by an event source number specified in the ENM.

13. The processing unit of claim 11, wherein the the IPC is further configured to:

in response to more than one of the multiple virtual processor threads not already having a pending interrupt, select one of the multiple virtual processor threads to interrupt that does not already have a pending interrupt based on secondary selection criteria.

14. The processing unit of claim 11, wherein the IPC is further configured to:

in response to determining that all of multiple virtual processor threads within the group that are dispatched and operating on an associated physical processor have pending interrupts, determining whether an event priority specified in the ENM is greater than an operating priority of any of the multiple virtual processor threads; and in response to determining that the event priority is not greater than the operating priority of any of the multiple virtual processor threads, issue a reject message to a notification source designated by an event source number specified in the ENM.

15. The processing unit of claim 13, wherein the secondary selection criteria includes one or more of an event priority, specified in the ENM, relative to an operating priority for each of the multiple virtual processor threads, a least recently used (LRU) one of the multiple virtual processor threads, and a random one of the multiple virtual processor threads.

16. The processing unit of claim 14, wherein the IPC is further configured to:

in response to determining that the event priority is greater than the operating priority of any of the multiple virtual processor threads, selecting one of the multiple virtual processor threads to interrupt with the operating priority less than the event priority.

17. A design structure tangibly embodied in a computer-readable storage device for designing, manufacturing, or testing an integrated circuit, the design structure comprising:

an interrupt source controller (ISC); and an interrupt presentation controller (IPC) coupled to the ISC, wherein the IPC is configured to:

receive an event notification message (ENM) from the ISC, wherein the ENM specifies a level, an event target number, and a non-zero number of bits to ignore; and determine a group of virtual processor threads that may be potentially interrupted based on the event target number, the number of bits to ignore, and a process identifier (ID) when the level specified in the ENM corresponds to a user level, wherein the event target number identifies a specific virtual processor thread and the number of bits to ignore identifies the number of lower-order bits to ignore with respect to the specific virtual processor thread when determining a group of virtual processor threads that may be potentially interrupted;

determine whether virtual processor threads within the group of virtual processor threads are dispatched and operating on an associated physical processor;

in response to determining multiple virtual processor threads within the group of virtual processor threads are dispatched and operating on an associated physical processor, select one of the multiple virtual processor threads to interrupt that does not already have a pending interrupt; and in response to no virtual processor thread within the group of virtual processor threads being dispatched and operating on an associated physical processor, transmit an escalate message, wherein the escalate message includes an escalate event number that is used by an interrupt source controller (ISC) to generate a subsequent ENM.

18. The design structure of claim 17, wherein the IPC is further configured to:

in response to more than one of the multiple virtual processor threads not already having a pending interrupt, select one of the multiple virtual processor threads to interrupt that does not already have a pending interrupt based on secondary selection criteria.

19. The design structure of claim 17, wherein the IPC is further configured to:

in response to determining that all of multiple virtual processor threads within the group that are dispatched and operating on an associated physical processor— have pending interrupts, determining whether an event priority specified in the ENM is greater than an operating priority of any of the multiple virtual processor threads; and in response to determining that the event priority is not greater than the operating priority of any of the multiple virtual processor threads, issue a reject message to a notification source designated by an event source number specified in the ENM.

20. The design structure of claim 18, wherein the secondary selection criteria includes one or more of an event priority, specified in the ENM, relative to an operating priority for each of the multiple virtual processor threads, a least recently used (LRU) one of the multiple virtual processor threads, and a random one of the multiple virtual processor threads.

* * * * *